United States Patent
Xing et al.

(10) Patent No.: US 12,108,288 B2
(45) Date of Patent: Oct. 1, 2024

(54) COMMUNICATION METHOD AND APPARATUS

(71) Applicant: Huawei Technologies Co., Ltd., Shenzhen (CN)

(72) Inventors: Weijun Xing, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 17/748,231

(22) Filed: May 19, 2022

(65) Prior Publication Data

US 2022/0279389 A1 Sep. 1, 2022

Related U.S. Application Data

(63) Continuation of application No. PCT/CN2020/127224, filed on Nov. 6, 2020.

(30) Foreign Application Priority Data

Nov. 19, 2019 (CN) .......................... 201911136665.4

(51) Int. Cl.
 *H04W 28/24* (2009.01)
 *H04W 28/02* (2009.01)
 *H04W 92/18* (2009.01)

(52) U.S. Cl.
 CPC ....... *H04W 28/24* (2013.01); *H04W 28/0226* (2013.01); *H04W 28/0268* (2013.01); *H04W 92/18* (2013.01)

(58) Field of Classification Search
 None
 See application file for complete search history.

(56) References Cited

U.S. PATENT DOCUMENTS 11,375,397 B2 * 6/2022 Lu ........................ H04W 76/23
2018/0376357 A1 12/2018 Tavares Coutinho et al.
(Continued)

FOREIGN PATENT DOCUMENTS

| CN | 109121121 A | 1/2019 |
| CN | 110312285 A | 10/2019 |

(Continued)

OTHER PUBLICATIONS

3GPP TS 23.287 V16.0.0, Sep. 2019, "3rd Generation Partnership Project; Technical Specification Group Services and System Aspects; Architecture enhancements for 5G System (5GS) to support Vehicle-to-Everything (V2X) services (Release 16)," 49 pages.

(Continued)

Primary Examiner — Brian S Roberts
(74) Attorney, Agent, or Firm — Conley Rose, P.C.

(57) ABSTRACT

A communication method includes that a first terminal learns, based on first quality of service (QoS) status information of multicast communication provided by a second terminal, that a range between the first terminal and the second terminal is greater than a first communication range threshold in QoS requirement information of multicast communication in a multicast group, and accordingly adjusts the first communication range threshold to a second communication range threshold having a larger value, to adjust a QoS requirement of multicast communication between the first terminal and the second terminal.

20 Claims, 5 Drawing Sheets

(56) References Cited

U.S. PATENT DOCUMENTS

| | | | |
|---|---|---|---|
| 2019/0281491 A1 | 9/2019 | Cheng et al. | |
| 2020/0329417 A1 | 10/2020 | Huang et al. | |
| 2021/0007118 A1 | 1/2021 | Liu | |
| 2022/0014973 A1* | 1/2022 | Perras | H04L 1/0017 |

FOREIGN PATENT DOCUMENTS

| | | |
|---|---|---|
| IN | 109996306 A | 7/2019 |
| WO | 2019006085 A1 | 1/2019 |
| WO | 2019149182 A1 | 8/2019 |

OTHER PUBLICATIONS

3GPP TR 23.764 V0.2.0, Sep. 2019, "3rd Generation Partnership Project; Technical Specification Group Services and System Aspects; Study on enhancements to application layer support for V2X services; (Release 17)," 17 pages.

Fujitsu, "Further Study on Tx-Rx Distance based HARQ Feedback," 3GPP TSG RAN WG1 #96b, R1-1905378, Xian, China, Apr. 8-12, 2019, 3 pages.

Qualcomm Incorporated, "Design aspects and requirements for QoS," 3GPP TSG RAN WG1 Ad-Hoc Meeting 1901 R1-1900890, Taipei, Taiwan, Jan. 21-25, 2019, 5 pages.

Nokia et al., "HARQ feedback for groupcast in the light of minimum required communication range," 3GPP TSG-RAN WG2 Meeting #106, R2-1906831, Reno, USA, May 13-17, 2019, 2 pages.

Qualcomm Incorporated, "Discussion on the usage of range parameter in NR V2X," 3GPP TSG-RAN WG2 Meeting #106, R2-1907552, Reno, USA, May 13-17, 2019, 2 pages.

Nokia et al., "Definition of Range," 3GPP TSG-SA WG2 Meeting #134, S2-1907265, Jun. 24-28, 2019, Sapporo, Japan, 4 pages.

Ericsson, "Update of QoS related analytics terminology," 3GPP TSG-SA WG2 Meeting #134, S2-1907483, Sapporo, JP, Jun. 24-28, 2019, 2 pages.

Huawei, "Solution on PC5 QoS aspects," 3GPP TSG-SA WG6 Meeting #34, S6-192186, Reno, Nevada US Nov. 11-15, 2019, 3 pages.

Huawei, "Solution on PC5 QoS aspects," 3GPP TSG-SA WG6 Meeting #34, S6-192257, Reno, Nevada US, Nov. 11-15, 2019, 3 pages.

RAN1, "Reply LS to SA2 on use of Range parameter in NR sidelink," 3GPP TSG RAN WG1 Meeting #97, R1-1907908, Reno, USA, May 13-17, 2019, total 2 pages.

\* cited by examiner

COMMUNICATION METHOD AND APPARATUS

CROSS-REFERENCE TO RELATED APPLICATIONS

This is a continuation of International Patent Application No. PCT/CN2020/127224 filed on Nov. 6, 2020, which claims priority to Chinese Patent Application No. 201911136665.4 filed on Nov. 19, 2019. The disclosures of the aforementioned applications are hereby incorporated by reference in their entireties.

TECHNICAL FIELD

This application relates to the communication field, and in particular, to a communication method and an apparatus.

BACKGROUND

A first terminal and a second terminal in a multicast group complete multicast communication based on an allowed maximum communication range. Further, the first terminal needs to send location information of the first terminal and a quality of service (QoS) requirement parameter to each second terminal on a control channel, and send a multicast service data packet to the second terminal on a data channel corresponding to the control channel. Correspondingly, after parsing the control channel, the second terminal may determine, based on location information of the second terminal, whether a range between the second terminal and the first terminal is less than the maximum communication range. If the range between the second terminal and the first terminal is less than the maximum communication range, the second terminal sends feedback information to the first terminal after receiving the multicast service data packet. The first terminal adjusts the QoS requirement parameter based on the feedback information.

However, if the range between the first terminal and the second terminal is greater than the maximum communication range, the second terminal does not send any feedback information to the first terminal. To be specific, in this scenario, the first terminal cannot learn a multicast communication status between the first terminal and a receiving terminal beyond the maximum communication range, and certainly cannot accordingly adjust the QoS requirement parameter to ensure reliability of the multicast communication. Consequently, quality of the multicast communication is poor.

SUMMARY

Embodiments of this application provide a communication method and an apparatus, to resolve a problem that a multicast communication status between terminals whose actual range is greater than a maximum communication range in QoS requirement information of multicast communication in a multicast group cannot be obtained, and therefore a QoS requirement parameter of the multicast communication cannot be adjusted. This can improve reliability of the multicast communication.

To achieve the foregoing objective, this application uses the following technical solutions.

According to a first aspect, a communication method is provided. The communication method is applied to a multicast group, and the multicast group includes a first terminal and a second terminal. The communication method includes that the first terminal receives first QoS status information of multicast communication, where the first QoS status information includes first range indication information. The first terminal determines, based on the first range indication information, that a range between the first terminal and the second terminal is greater than a first communication range threshold in first QoS requirement information. The first terminal sends second QoS requirement information of the multicast communication, where the second QoS requirement information includes a second communication range threshold, and the second communication range threshold is greater than the first communication range threshold.

According to the communication method in the first aspect, the first terminal can learn, based on the first range indication information provided by the second terminal, that the range between the first terminal and the second terminal is greater than the first communication range threshold in QoS requirement information of the multicast communication in the multicast group. Accordingly, the first terminal adjusts a maximum communication range in the QoS requirement information of the multicast communication in the multicast group from the first communication range threshold to the second communication range threshold, where the second communication range threshold is greater than the first communication range threshold, so that the first terminal can update a QoS requirement parameter of the multicast communication based on the second communication range threshold used after the adjustment. In this way, adaptive adjustment of a QoS requirement of the multicast communication is implemented, and multicast communication quality can be adjusted. This can resolve a problem that the QoS requirement of the multicast communication cannot be adjusted because a multicast communication status between terminals whose actual range is greater than the maximum communication range in the QoS requirement information of the multicast communication in the multicast group cannot be obtained. This can improve reliability of the multicast communication.

For example, the first range indication information may include one or more of the following: an indication for out of range, location information of the second terminal, and the range between the first terminal and the second terminal. The indication for out of range is used for indicating that the range between the first terminal and the second terminal is greater than the first communication range threshold.

In a possible design method, the first QoS requirement information may further include a first QoS requirement parameter. The first QoS status information may further include an unsatisfied QoS requirement parameter in the first QoS requirement parameter. The second QoS requirement information may include a second QoS requirement parameter. A QoS requirement corresponding to the second QoS requirement parameter is lower than a QoS requirement corresponding to the first QoS requirement parameter.

For example, the first QoS requirement parameter may include a first PC5 interface QoS identifier (PQI), the second QoS requirement parameter may include a second PQI, and a QoS requirement corresponding to the second PC5 interface PQI is lower than a QoS requirement corresponding to the first PC5 interface PQI.

For example, the first QoS requirement parameter may include a first PC5 interface flow bit rate, the second QoS requirement parameter may include a second PC5 interface flow bit rate, and the second PC5 interface flow bit rate is lower than the first PC5 interface flow bit rate.

In a possible design method, the first terminal includes a first application layer, a first vehicle-to-everything (V2X)

layer, and a first access layer. Correspondingly, that the first terminal receives first QoS status information of multicast communication may include that the first application layer receives the first QoS status information from an application server. Alternatively, the first application layer receives the first QoS status information from the second terminal through the first V2X layer and the first access layer.

In a possible design method, the first terminal includes a first application layer, a first V2X layer, and a first access layer. Correspondingly, that the first terminal sends second QoS requirement information of the multicast communication may include one or more of the following. The first application layer sends the second QoS requirement information of the multicast communication to the first access layer through the first V2X layer, or the first application layer sends the second QoS requirement information of the multicast communication to the second terminal through the first V2X layer and the first access layer.

According to a second aspect, a communication method is provided. The communication method is applied to a multicast group, and the multicast group includes a first terminal and a second terminal. The communication method includes. The second terminal sends first QoS status information of multicast communication, where the first QoS status information includes first range indication information, and the first range indication information is used for determining that a range between the first terminal and the second terminal is greater than a first communication range threshold in first QoS requirement information. The second terminal receives second QoS requirement information of the multicast communication, where the second QoS requirement information includes a second communication range threshold, and the second communication range threshold is greater than the first communication range threshold.

For example, the first range indication information may include one or more of the following: an indication for out of range, location information of the second terminal, and the range between the first terminal and the second terminal. The indication for out of range is used for indicating that the range between the first terminal and the second terminal is greater than the first communication range threshold.

In a possible design method, the first QoS requirement information may further include a first QoS requirement parameter. The first QoS status information may further include an unsatisfied QoS requirement parameter in the first QoS requirement parameter. The second QoS requirement information may include a second QoS requirement parameter. A QoS requirement corresponding to the second QoS requirement parameter is lower than a QoS requirement corresponding to the first QoS requirement parameter.

For example, the first QoS requirement parameter may include a first PQI, the second QoS requirement parameter may include a second PQI, and a QoS requirement corresponding to the second PC5 interface PQI is lower than a QoS requirement corresponding to the first PC5 interface PQI.

For example, the first QoS requirement parameter may include a first PC5 interface flow bit rate, the second QoS requirement parameter may include a second PC5 interface flow bit rate, and the second PC5 interface flow bit rate is lower than the first PC5 interface flow bit rate.

In a possible design method, the second terminal includes a second application layer, a second V2X layer, and a second access layer. Correspondingly, that the second terminal sends first QoS status information of the multicast communication may include that the second application layer sends the first QoS status information of the multicast communication to an application server. Alternatively, optionally, the second application layer sends the first QoS status information of the multicast communication to the first terminal through the second V2X layer and the second access layer.

In a possible design method, the second terminal includes a second application layer, a second V2X layer, and a second access layer. Correspondingly, that the second terminal receives second QoS requirement information of the multicast communication may include that the second application layer receives the second QoS requirement information from the first terminal through the second V2X layer and the second access layer.

For technical effects of the communication method according to the second aspect, refer to technical effects of the communication method according to the first aspect. Details are not described herein again.

According to a third aspect, a communication method is provided. The communication method is applied to a third terminal in a multicast group, the third terminal includes a third application layer, a third V2X layer, and a third access layer, and the multicast group further includes a fourth terminal. The communication method includes that the third V2X layer receives at least two groups of candidate QoS requirement information of multicast communication in the multicast group from the third application layer. The third V2X layer sends third QoS requirement information of the multicast communication to the third access layer based on the at least two groups of candidate QoS requirement information, where the third QoS requirement information includes a third communication range threshold. The third V2X layer receives second QoS status information of the multicast communication from the third access layer, where the second QoS status information includes second range indication information, and the second range indication information is used for determining that a range between the third terminal and the fourth terminal is greater than the third communication range threshold. The third V2X layer sends fourth QoS requirement information of the multicast communication to the third access layer, where the fourth QoS requirement information belongs to the at least two groups of candidate QoS requirement information, the fourth QoS requirement information includes a fourth communication range threshold, and the fourth communication range threshold is greater than the third communication range threshold.

According to the communication method in the third aspect, a V2X layer of any terminal such as the third terminal in the multicast group can learn, based on the second range indication information provided by the access layer of the third terminal, that the range between the third terminal and the fourth terminal in the multicast group is greater than the third communication range threshold in QoS requirement information of the multicast communication in the multicast group. Accordingly, the third terminal selects one group from the at least two groups of candidate QoS requirement information in the QoS requirement information that is of the multicast communication in the multicast group and that is from the application layer of the third terminal as the fourth QoS requirement information, and delivers the fourth QoS requirement information to the access layer of the third terminal, so that the third terminal can implement multicast communication with the fourth terminal in the multicast group based on the fourth QoS requirement information. The fourth QoS requirement information includes a fourth communication range, and the fourth communication range is greater than a third communication range, so that the third terminal can update a QoS requirement parameter of the multicast communication based on the fourth communication range threshold used after the adjustment. In this way, adaptive adjustment of a QoS requirement of multicast communication is implemented, and multicast communication quality can be adjusted. This can improve reliability of the multicast communication.

For example, the second range indication information may include one or more of the following: an indication for out of range, location information of the fourth terminal, and the range between the third terminal and the fourth terminal. The indication for out of range is used for indicating that the range between the third terminal and the fourth terminal is greater than the third communication range threshold.

In a possible design method, the third QoS requirement information may further include a third QoS requirement parameter. The second QoS status information may further include an unsatisfied QoS requirement parameter in the third QoS requirement parameter. The fourth QoS requirement information may include a fourth QoS requirement parameter. A QoS requirement corresponding to the fourth QoS requirement parameter is lower than a QoS requirement corresponding to the third QoS requirement parameter.

For example, the third QoS requirement parameter may include a third PQI, the fourth QoS requirement parameter may include a fourth PQI, and a QoS requirement corresponding to the fourth PC5 interface PQI is lower than a QoS requirement corresponding to the third PC5 interface PQI.

For example, the third QoS requirement parameter may include a third PC5 interface flow bit rate, the fourth QoS requirement parameter may include a fourth PC5 interface flow bit rate, and the fourth PC5 interface flow bit rate is lower than the third PC5 interface flow bit rate.

In a possible design method, the communication method according to the third aspect may further include that the third V2X layer receives a selection indication from the third application layer, where the selection indication is used for indicating the third V2X layer to select one group of QoS requirement information from the at least two groups of candidate QoS requirement information.

According to a fourth aspect, a communication apparatus is provided. The communication apparatus belongs to a multicast group, and the multicast group further includes a second terminal. The communication apparatus includes a processing module and a transceiver module. The transceiver module is configured to receive first QoS status information of multicast communication, where the first QoS status information includes first range indication information. The processing module is configured to determine, based on the first range indication information, that a range between the communication apparatus and the second terminal is greater than a first communication range threshold in first QoS requirement information. The transceiver module is further configured to send second QoS requirement information of the multicast communication, where the second QoS requirement information includes a second communication range threshold, and the second communication range threshold is greater than the first communication range threshold.

For example, the first range indication information may include one or more of the following: an indication for out of range, location information of the second terminal, and the range between the communication apparatus and the second terminal. The indication for out of range is used for indicating that the range between the communication apparatus and the second terminal is greater than the first communication range threshold.

In a possible design, the first QoS requirement information may further include a first QoS requirement parameter. The first QoS status information may further include an unsatisfied QoS requirement parameter in the first QoS requirement parameter. The second QoS requirement information may include a second QoS requirement parameter. A QoS requirement corresponding to the second QoS requirement parameter is lower than a QoS requirement corresponding to the first QoS requirement parameter.

For example, the first QoS requirement parameter may include a first PQI, the second QoS requirement parameter may include a second PQI, and a QoS requirement corresponding to the second PC5 interface PQI is lower than a QoS requirement corresponding to the first PC5 interface PQI.

For example, the first QoS requirement parameter may include a first PC5 interface flow bit rate, the second QoS requirement parameter may include a second PC5 interface flow bit rate, and the second PC5 interface flow bit rate is lower than the first PC5 interface flow bit rate.

In a possible design, the communication apparatus according to the fourth aspect includes a first application layer, a first V2X layer, and a first access layer. The first application layer is configured to receive the first QoS status information from an application server. The first application layer is further configured to receive the first QoS status information from the second terminal through the first V2X layer and the first access layer.

In a possible design, the communication apparatus according to the fourth aspect includes a first application layer, a first V2X layer, and a first access layer. The first application layer is configured to send the second QoS requirement information of the multicast communication to the first access layer through the first V2X layer. The first application layer is further configured to send the second QoS requirement information of the multicast communication to the second terminal through the first V2X layer and the first access layer.

Optionally, the communication apparatus according to the fourth aspect may further include a storage module, and the storage module stores a program or instructions. When the processing module executes the program or the instructions, the communication apparatus according to the fourth aspect is enabled to perform the communication method according to the first aspect.

It should be noted that the communication apparatus in the fourth aspect may be a terminal device, or may be a chip or a chip system disposed in a terminal device. This is not limited in this application.

For technical effects of the communication apparatus according to the fourth aspect, refer to technical effects of the communication method according to the first aspect. Details are not described herein again.

According to a fifth aspect, a communication apparatus is provided. The communication apparatus belongs to a multicast group, and the multicast group further includes a first terminal. The communication apparatus includes a processing module and a transceiver module. The transceiver module is configured to send first QoS status information of multicast communication, where the first QoS status information includes first range indication information. The processing module is configured to determine, based on the first range indication information, that a range between the first terminal and the communication apparatus is greater than a first communication range threshold in first QoS requirement information. The transceiver module is further configured to receive second QoS requirement information of the multicast communication, where the second QoS requirement information includes a second communication range threshold, and the second communication range threshold is greater than the first communication range threshold.

For example, the first range indication information may include one or more of the following: an indication for out of range, location information of the communication apparatus, and the range between the first terminal and the communication apparatus. The indication for out of range is used for indicating that the range between the first terminal and the communication apparatus is greater than the first communication range threshold.

In a possible design, the first QoS requirement information may further include a first QoS requirement parameter. The first QoS status information may further include an unsatisfied QoS requirement parameter in the first QoS requirement parameter. The second QoS requirement information may include a second QoS requirement parameter. A QoS requirement corresponding to the second QoS requirement parameter is lower than a QoS requirement corresponding to the first QoS requirement parameter.

For example, the first QoS requirement parameter may include a first PQI, the second QoS requirement parameter may include a second PQI, and a QoS requirement corresponding to the second PC5 interface PQI is lower than a QoS requirement corresponding to the first PC5 interface PQI.

For example, the first QoS requirement parameter may include a first PC5 interface flow bit rate, the second QoS requirement parameter may include a second PC5 interface flow bit rate, and the second PC5 interface flow bit rate is lower than the first PC5 interface flow bit rate.

In a possible design, the communication apparatus according to the fifth aspect includes a second application layer, a second V2X layer, and a second access layer. The second application layer is configured to send the first QoS status information of the multicast communication to an application server. The second application layer is further configured to send the first QoS status information of the multicast communication to the first terminal through the second V2X layer and the second access layer.

In a possible design, the communication apparatus according to the fifth aspect includes a second application layer, a second V2X layer, and a second access layer. The second application layer is further configured to receive the second QoS requirement information from the first terminal through the second V2X layer and the second access layer.

Optionally, the communication apparatus according to the fifth aspect may further include a storage module. The storage module stores a program or instructions. When the processing module executes the program or the instructions, the communication apparatus according to the fifth aspect is enabled to perform the communication method according to the second aspect.

It should be noted that the communication apparatus in the fifth aspect may be a terminal device, or may be a chip or a chip system disposed in a terminal device. This is not limited in this application.

For technical effects of the communication apparatus according to the fifth aspect, refer to technical effects of the communication method according to the first aspect. Details are not described herein again.

According to a sixth aspect, a communication apparatus is provided. The communication apparatus is a third terminal in a multicast group, the communication apparatus includes a third application layer, a third V2X layer, and a third access layer, and the multicast group further includes a fourth terminal. The third V2X layer is configured to receive at least two groups of candidate QoS requirement information of multicast communication in the multicast group from the third application layer. The third V2X layer is further configured to send third QoS requirement information of the multicast communication to the third access layer based on the at least two groups of candidate QoS requirement information, where the third QoS requirement information includes a third communication range threshold. The third V2X layer is further configured to receive second QoS status information of the multicast communication from the third access layer, where the second QoS status information includes second range indication information, and the second range indication information is used for determining that a range between the communication apparatus in the sixth aspect and the fourth terminal is greater than the third communication range threshold. The third V2X layer is further configured to send fourth QoS requirement information of the multicast communication to the third access layer, where the fourth QoS requirement information belongs to the at least two groups of candidate QoS requirement information, the fourth QoS requirement information includes a fourth communication range threshold, and the fourth communication range threshold is greater than the third communication range threshold.

For example, the second range indication information may include one or more of the following: an indication for out of range, location information of the fourth terminal, and the range between the communication apparatus and the fourth terminal. The indication for out of range is used for indicating that the range between the communication apparatus and the fourth terminal is greater than the third communication range threshold.

In a possible design, the third QoS requirement information may further include a third QoS requirement parameter. The second QoS status information may further include an unsatisfied QoS requirement parameter in the third QoS requirement parameter. The fourth QoS requirement information may include a fourth QoS requirement parameter. A QoS requirement corresponding to the fourth QoS requirement parameter is lower than a QoS requirement corresponding to the third QoS requirement parameter.

For example, the third QoS requirement parameter may include a third PQI, the fourth QoS requirement parameter may include a fourth PQI, and a QoS requirement corresponding to the fourth PC5 interface PQI is lower than a QoS requirement corresponding to the third PC5 interface PQI.

For example, the third QoS requirement parameter may include a third PC5 interface flow bit rate, the fourth QoS requirement parameter may include a fourth PC5 interface flow bit rate, and the fourth PC5 interface flow bit rate is lower than the third PC5 interface flow bit rate.

In a possible design, the third V2X layer is further configured to receive a selection indication from the third application layer, where the selection indication is used for indicating the third V2X layer to select one group of QoS requirement information from the at least two groups of candidate QoS requirement information.

Optionally, the communication apparatus according to the sixth aspect may further include a storage module. The storage module stores a program or instructions. When the processing module executes the program or the instructions, the communication apparatus according to the sixth aspect is enabled to perform the communication method according to the third aspect.

It should be noted that the communication apparatus in the sixth aspect may be a terminal device, or may be a chip or a chip system disposed in a terminal device. This is not limited in this application.

For technical effects of the communication apparatus according to the sixth aspect, refer to technical effects of the communication method according to the third aspect. Details are not described herein again.

According to a seventh aspect, a communication apparatus is provided. The communication apparatus is configured to perform the communication method according to any one of the possible implementations of the first aspect to the third aspect.

According to an eighth aspect, a communication apparatus is provided. The communication apparatus includes a processor. The processor is coupled to a memory, where the memory is configured to store a computer program. The processor is configured to execute the computer program stored in the memory, to enable the communication apparatus to perform the communication method according to any one of the possible implementations of the first aspect to the third aspect.

In a possible design, the communication apparatus in the eighth aspect may further include a transceiver. The transceiver may be a transceiver circuit or an input/output port. The transceiver may be used by the communication apparatus to communicate with another communication apparatus.

In this application, the communication apparatus according to the eighth aspect may be a terminal device and/or a network device, or a chip or a chip system disposed inside the terminal device and/or the network device.

For technical effects of the communication apparatus according to the seventh aspect or the eighth aspect, refer to the technical effects of the communication method according to any one of the implementations of the first aspect to the third aspect. Details are not described herein again.

According to a ninth aspect, a chip system is provided. The chip system includes a processor and an input/output port. The processor is configured to implement a processing function in the communication method according to any one of the possible implementations of the first aspect to the third aspect, the input/output port is configured to implement sending and receiving functions in the communication method according to any one of the possible implementations of the first aspect to the third aspect.

In a possible design, the chip system further includes a memory. The memory is configured to store program instructions and data for implementing the functions in the first aspect or the second aspect.

The chip system may include a chip, or may include a chip and another discrete component.

According to a tenth aspect, a communication system is provided. The system includes a plurality of terminal devices and one or more network devices.

According to an eleventh aspect, a computer-readable storage medium is provided. The computer-readable storage medium stores computer instructions. When the computer instructions are run on a computer, the computer is enabled to perform the communication method according to any one of the possible implementations of the first aspect to the third aspect.

According to a twelfth aspect, a computer program product including instructions is provided. The computer program product includes a computer program or the instructions. When the computer program is run or the instructions are run on a computer, the computer is enabled to perform the communication method according to any one of the possible implementations of the first aspect to the third aspect.

DESCRIPTION OF EMBODIMENTS

The following describes the technical solutions of this application with reference to the accompanying drawings.

The technical solutions in embodiments of this application may be applied to various communication systems, for example, an internet of vehicles communication system, a V2X communication system, a device-to-device (D2D) communication system, a Long-Term Evolution (LTE) system, a Worldwide Interoperability for Microwave Access (WIMAX) communication system, a 5th generation (5G) mobile communication system such as a New Radio (NR) system, and a future communication system such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, in embodiments of this application, terms such as "example" and "for example" are used for representing giving an example, an illustration, or a description. Any embodiment or design scheme described as an "example" in this application should not be explained as being more preferred or having more advantages than another embodiment or design scheme. Further, the term "example" is used for presenting a concept in a specific manner.

In embodiments of this application, the terms "information", "signal", "message", "channel", and "signaling" may sometimes be interchangeably used. It should be noted that, meanings expressed by the terms are consistent when differences between the terms are not emphasized. "Of", "corresponding, corresponding (relevant)", and "corresponding" may be interchangeably used sometimes. It should be noted that, meanings expressed by the terms are consistent when differences between the terms are not emphasized.

In embodiments of this application, sometimes a subscript such as W1 may be written in an incorrect form such as W1. Expressed meanings are consistent when differences between them are not emphasized.

A network architecture and a service scenario described in embodiments of this application are intended to describe the technical solution in embodiments of this application more clearly, and do not constitute a limitation on the technical solution provided in embodiments of this application. A person of ordinary skill in the art may know that with evolution of the network architecture and emergence of a new service scenario, the technical solution provided in embodiments of this application are also applicable to similar technical problems.

Figure 1:
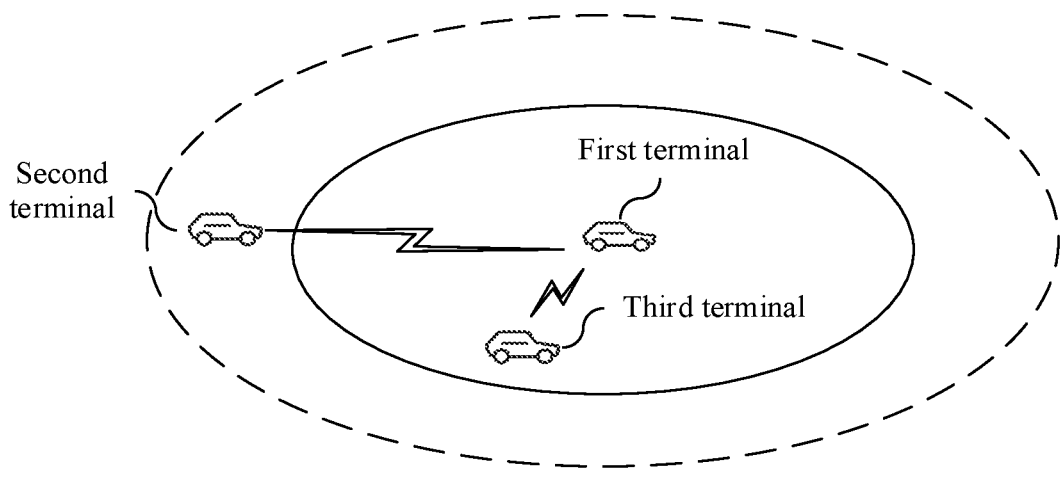
FIG. 1 is a schematic diagram of an architecture of a communication system according to an embodiment of this application.

Some scenarios in embodiments of this application are described by using a scenario in a communication system shown in FIG. 1 as an example. It should be noted that the solution of embodiments of this application may also be applied to another mobile communication system, and a corresponding name may also be replaced with a name of a corresponding function in the other mobile communication system.

For ease of understanding of embodiments of this application, the communication system shown in FIG. 1 is first used as an example to describe in detail a communication system to which embodiments of this application are applicable. FIG. 1 is a schematic diagram of an architecture of a communication system to which a communication method according to an embodiment of this application is applicable. As shown in FIG. 1, the communication system may be a multicast group, and the multicast group includes a plurality of terminals, such as a first terminal, a second terminal, and a third terminal.

In a possible design, the first terminal and the second terminal are used as an example. The first terminal is configured to perform the following steps: receiving first QoS status information of multicast communication from the second terminal, and sending second QoS requirement information of the multicast communication to the second terminal.

Correspondingly, the second terminal is configured to perform the following steps: sending the first QoS status information of the multicast communication to the first terminal, and receiving the second QoS requirement information of the multicast communication from the first terminal. The first QoS status information includes first range indication information, and the first range indication information is used for determining that a range between the first terminal and the second terminal is greater than a first communication range threshold in first QoS requirement information. The second QoS requirement information includes a second communication range threshold, and the second communication range threshold is greater than the first communication range threshold.

It should be understood that any one of the foregoing terminals may usually include an application layer, a V2X layer, and an access layer. Therefore, in another possible design, the any terminal learns, based on obtained QoS status information, that a range between the terminal and another terminal is greater than a communication range threshold in previous QoS requirement information of multicast communication in the multicast group. Then, the V2X layer of the any terminal may select a group of QoS requirement information from a plurality of groups of candidate QoS requirement information that is of multicast communication in the multicast group and that is from the application layer of the terminal, and deliver the group of QoS requirement information to the access layer of the terminal. A communication range threshold included in the later delivered QoS requirement information is greater than the previously delivered communication range threshold, so that a QoS requirement parameter is adjusted. The third terminal shown in FIG. 1 is used as an example. The third terminal includes a third application layer, a third V2X layer, and a third access layer. The third V2X layer is configured to perform the following steps: receiving at least two groups of candidate QoS requirement information of multicast communication in a multicast group from the third application layer, and sending third QoS requirement information of the multicast communication to the third access layer based on the at least two groups of candidate QoS requirement information, where the third QoS requirement information includes a third communication range threshold, and then receiving second QoS status information of the multicast communication from the third access layer, and sending fourth QoS requirement information of the multicast communication to the third access layer. The second QoS status information includes second range indication information, the second range indication information is used for determining that a range between the third terminal and a fourth terminal is greater than the third communication range threshold, and the fourth QoS requirement information belongs to the at least two groups of candidate QoS requirement information. The fourth QoS requirement information includes a fourth communication range threshold, and the fourth communication range threshold is greater than the third communication range threshold.

It should be understood that FIG. 1 is merely a simplified schematic diagram of an example for ease of understanding. The communication system may further include a network device and/or another terminal device that are/is not shown in FIG. 1.

The network device may include a device that is located on a network side of the communication system and that has a wireless transceiver function, a chip or a chip system that can be disposed in the device, or a core network device, for example, a network element in a 5G core network. The network device includes but is not limited to an access point (AP) in a WI-FI system, such as a home gateway, a router, a server, a switch, and a bridge, an evolved NodeB (eNB), a radio network controller (RNC), a NodeB (NB), a base station controller (BSC), a base transceiver station (BTS), a home base station (for example, a home evolved NodeB, or a home NodeB (HNB)), a baseband unit (BBU), a wireless relay node, a wireless backhaul node, a transmission point (transmission and reception point (TRP) or transmission point (TP)), or the like. The network device may alternatively be a gNB or a transmission point (TRP or TP) in a 5G system, for example, an NR system, or one antenna panel or a group of antenna panels (including a plurality of antenna panels) of a base station in a 5G system. The network device may alternatively be a network node, such as a BBU, a distributed unit (DU), or a road side unit (RSU) having a base station function, that constitutes a gNB or a transmission point.

The terminal device is a terminal that accesses the communication system and that has a wireless transceiver function, or a chip or a chip system that can be disposed in the terminal. The terminal device may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (IPAD), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a vehicle-mounted terminal, an RSU that has a terminal function, or the like. The terminal device in this application may alternatively be a vehicle-mounted module, a vehicle-mounted component, a vehicle-mounted chip, or a vehicle-mounted unit with which a vehicle is equipped as one or more components or units. By using the vehicle-mounted module, the vehicle-mounted component, the vehicle-mounted chip, or the vehicle-mounted unit with which the vehicle is equipped, the vehicle can implement the communication method provided in this application.

It should be noted that the communication method provided in embodiments of this application may be used for multicast communication between any two terminals shown in FIG. 1.

Figure 2:
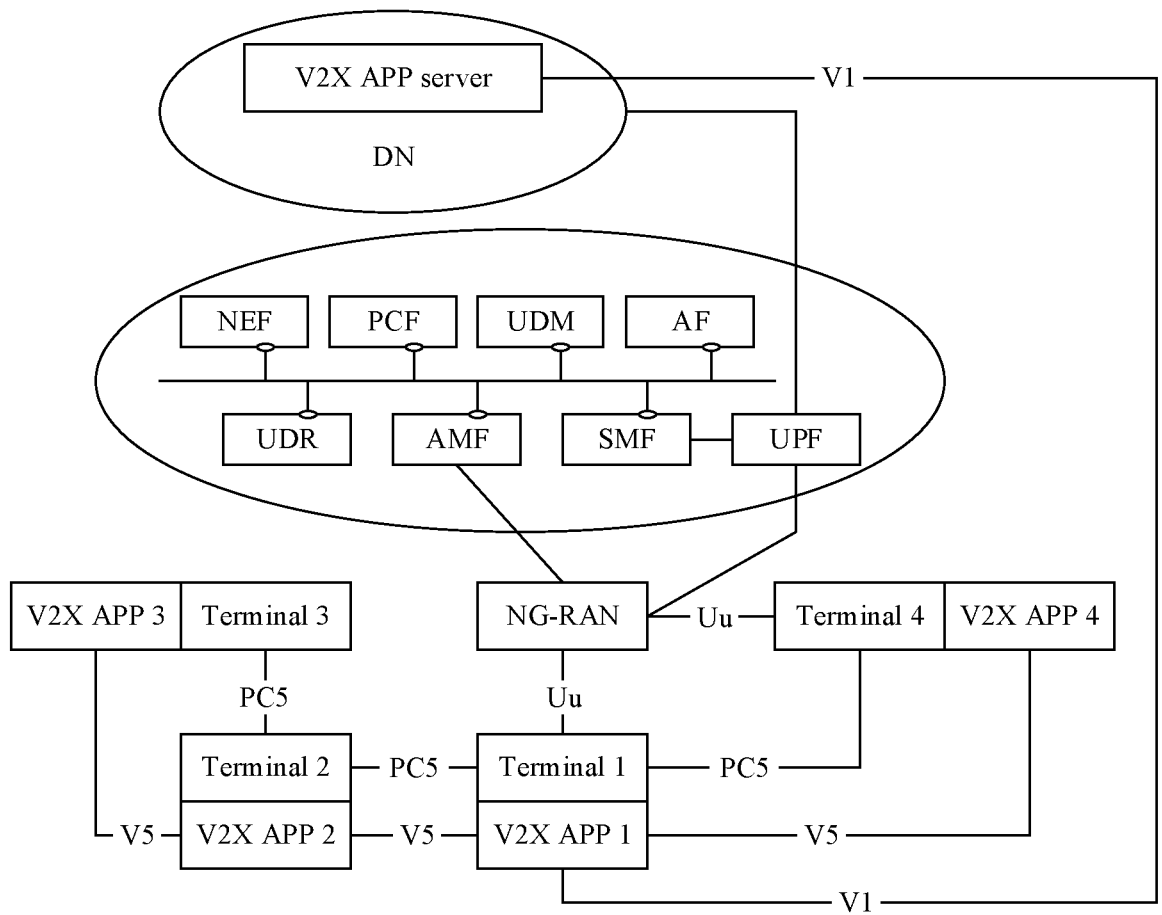
FIG. 2 is a schematic diagram of an architecture of a communication system according to an embodiment of this application.

FIG. 2 shows an example of a communication system in which the communication system shown in FIG. 1 is combined with a 5G core network. As shown in FIG. 2, the communication system may include a plurality of user equipments (UEs), an access network, a core network, a data network (DN), and the like. The core network may include an access and mobility management function (AMF) network element, a policy control function (PCF) network element, a unified data management (UDM) network element, a unified data repository (UDR), a session management function (SMF) network element, a user plane function (UPF) network element, a network exposure function (NEF), an application function (AF) network element, or the like. The following describes network elements in this application with reference to FIG. 2.

The UE may be referred to as a terminal, and the terminal may support V2X communication or another service. For example, the user equipment supports receiving or sending of a V2X message. In this case, the terminal may also be referred to as a V2X terminal. The V2X message may include but is not limited to a vehicle to vehicle (V2V) message, a vehicle to pedestrian (V2P) message, a vehicle to network (V2N) message, vehicle to infrastructure (V2I) information, an anti-collision message exchanged between vehicles, an entertainment application message, a navigation message exchanged between vehicles, and the like. It is clear that the terminal shown in FIG. 2 may include but is not limited to a vehicle-mounted terminal, a mobile phone, a tablet computer or a computer having a wireless transceiver function, a smart gas station, an intelligent traffic light, and the like.

The access network may include one or more access network devices. The access network device is responsible for radio resource management, uplink and downlink data classification, a QoS application, functions of completing signaling processing with a control plane network element and completing data forwarding with a UPF network element, and the like. For example, the access network device may be a base station, a broadband network gateway (BNG), an aggregation switch, a non-3rd Generation Partnership Project (3GPP) access device, or the like. The base station may include various types of base stations, for example, a macro base station, a micro base station (or a small cell), a relay station, and an access point. This is not limited in embodiments of this application. A device through which the terminal accesses the core network is referred to as the access network device in this specification, and details are not described herein. For example, the access network device may be an Evolved Universal Terrestrial Radio Access Network (E-UTRAN) device in a fourth generation (4G) network, a next generation radio access network (NG-RAN) device in a 5G network, or the like.

Main functions of the AMF network element include a termination point of a radio access network control plane, a termination point of non-access signaling, mobility management, lawful interception, access authorization/authentication, and the like.

The UPF network element is configured to route and forward a data packet, perform QoS control on user plane data, collect statistics on charging information, and the like.

The SMF network element is used for session management, Internet Protocol (IP) address assignment and management of the terminal, a function of selecting a manageable user plane, a termination point of a policy control and charging function interface, downlink data notification, and the like.

The PCF network element is configured to manage a network behavior, and provide a parameter related to a user policy for the terminal, a parameter related to an access and mobility (AM) policy for the AMF network element, and a parameter related to a session management (SM) policy for the SMF network element. In a V2X communication scenario, the PCF network element provides information such as authentication and policy parameters related to V2X communication for the terminal and the access network device.

The UDM network element is configured to manage subscription information, provide the subscription information for a related network element, and the like.

The UDR network element is configured to provide a storage and retrieval service for the PCF network element, store and retrieve structured data for exposure, store user information requested by the application function, and the like.

The NEF network element connects a core network element and an external application server, and provides services such as authentication and data forwarding when the external application server initiates a service request to the core network.

The AF network element may be an application server corresponding to an application, for example, a localized application server. A V2X application server may be considered as an AF network element.

The DN is a network, for example, an internet, used for transmitting data.

A communication interface between the terminal and the access network device is a Uu interface, and a communication interface between terminals is a PC5 interface. A transmission interface, at an application layer, between the terminal and the network used for transmitting data is a V1 interface, and an application transmission interface between terminals is a V5 interface.

It should be noted that a network formed by operator's network elements other than a RAN may be referred to as a core network. In the 4G network, the core network includes network elements such as a mobility management entity (MME), a serving gateway (S-GW), a public data network gateway (P-GW), and a home subscriber server (HSS). In the 5G network, the core network includes an AMF network element, an SMF network element, a UPF network element, a UDM network element, a PCF network element, and the like. In FIG. 2, the 5G network is merely used as an example, but does not constitute a specific limitation on the core network element.

It should be noted that the multicast group mentioned in this application may be a multicast communication group. The multicast group is used for multicast communication, and the multicast group may include two or more terminals. For example, in a same time period, a terminal in a multicast group serves as a sending terminal, and the sending terminal may send multicast service data to a terminal in the multicast group other than the sending terminal through a multicast channel. Correspondingly, the terminal in the multicast group other than the sending terminal may be referred to as a receiving terminal.

It should be noted that a network architecture to which embodiments of this application are applicable is not limited to the network architecture shown in FIG. 2. In addition, the network architecture shown in FIG. 2 is merely an example architecture, and a quantity of network elements included in the communication system, types of the network elements, and names of the network elements are not limited. For example, in addition to the network functional entities shown in FIG. 2, the network shown in FIG. 2 may further include another functional entity. For another example, the network elements in the architecture in FIG. 2 and names of the network elements are merely examples. During specific implementation, the network elements and a protocol layer may have other names. This is not limited in embodiments of this application.

Figure 3:
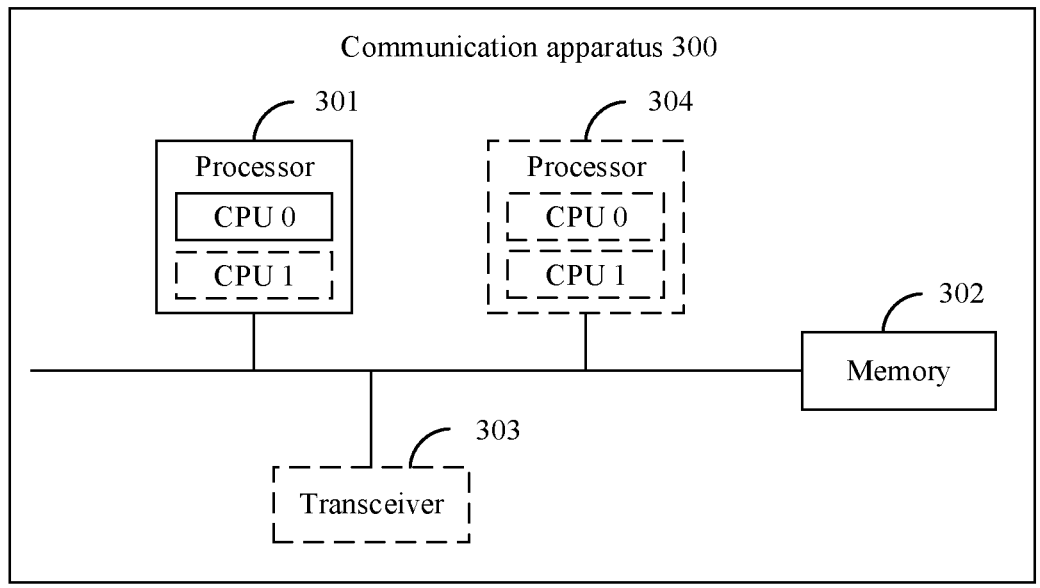
FIG. 3 is a schematic diagram of a structure of a communication apparatus according to an embodiment of this application.

FIG. 3 is a schematic diagram of a structure of a communication apparatus 300 that may be configured to perform a communication method according to an embodiment of this application. The communication apparatus 300 may be any terminal device shown in FIG. 1 or FIG. 2, or may be a chip or another component that has a terminal function and that is applied to any terminal device shown in FIG. 1 or FIG. 2. As shown in FIG. 3, the communication apparatus 300 may include a processor 301 and a memory 302. Optionally, the communication apparatus 300 may further include a transceiver 303. The processor 301 is coupled to the memory 302 and the transceiver 303. For example, the processor 301 may be connected to the memory 302 and the transceiver 303 through a communication bus.

The following describes each composition component of the communication apparatus 300 in detail with reference to FIG. 3.

The processor 301 is a control center of the communication apparatus 300, and may be one processor or may be a collective term of a plurality of processing elements. For example, the processor 301 may be one or more central processing units (CPUs), or an application-specific integrated circuit (ASIC), or may be configured as one or more integrated circuits implementing embodiments of this application, for example, one or more microprocessors (DSPs) or one or more field-programmable gate arrays (FPGAs).

The processor 301 may perform various functions of the communication apparatus 300 by running or executing a software program stored in the memory 302 and invoking data stored in the memory 302. For example, the communication apparatus 300 may perform the following functions of a first terminal in the following FIG. 4 or FIG. 5. For another example, the communication apparatus 300 may alternatively perform functions of a second terminal in the following FIG. 4 or FIG. 5. For another example, the communication apparatus 300 may alternatively perform functions of a third terminal in the following FIG. 6.

In specific implementation, in an embodiment, the processor 301 may include one or more CPUs, for example, a CPU 0 and a CPU 1 that are shown in FIG. 3.

During specific implementation, in an embodiment, the communication apparatus 300 may alternatively include a plurality of processors, for example, the processor 301 and a processor 304 shown in FIG. 3. Each of the processors may be a single-core processor (single-CPU) or may be a multi-core processor (multi-CPU). The processor herein may be one or more communication devices, circuits, and/or processing cores configured to process data (for example, computer program instructions).

The memory 302 may be a read-only memory (ROM) or another type of static storage communication device that can store static information and instructions, or a random-access memory (RAM) or another type of dynamic storage communication device that can store information and instructions, or may be an electrically erasable programmable ROM (EEPROM), a compact disc (CD) ROM (CD-ROM) or another CD storage, an optical disc storage (including a compact disc, a laser disc, an optical disc, a DIGITAL VERSATILE DISC (DVD), a BLU-RAY disc, or the like), a magnetic disk storage medium or another magnetic storage communication device, or any other medium that can be used for carrying or storing expected program code in a form of an instruction or a data structure and that can be accessed by a computer. However, the memory 302 is not limited thereto. The memory 302 may be integrated with the processor 301, or may exist independently, and is coupled to the processor 301 through an input/output port (not shown in FIG. 3) of the communication apparatus 300. This is not limited in this embodiment of this application.

The memory 302 is configured to store a software program for performing the solutions of this application, and the processor 301 controls execution of the software program. For a specific implementation, refer to the following method embodiment. Details are not described herein.

The transceiver 303 is configured to communicate with another communication apparatus. For example, the communication apparatus 300 may be a terminal device, and the transceiver 303 may be configured to communicate with a network device or communicate with another terminal device. In addition, the transceiver 303 may include a receiver and a transmitter (which are not separately shown in FIG. 3). The receiver is configured to implement a receiving function, and the transmitter is configured to implement a sending function. The transceiver 303 may be integrated with the processor 301, or may exist independently, and is coupled to the processor 301 through an input/output port (not shown in FIG. 3) of the communication apparatus 300. This is not limited in this embodiment of this application.

It should be noted that a structure of the communication apparatus 300 shown in FIG. 3 does not constitute a limitation on the communication apparatus. An actual communication apparatus may include more or fewer components than those shown in the figure, or combine some components, or have different component arrangement.

Figure 4:
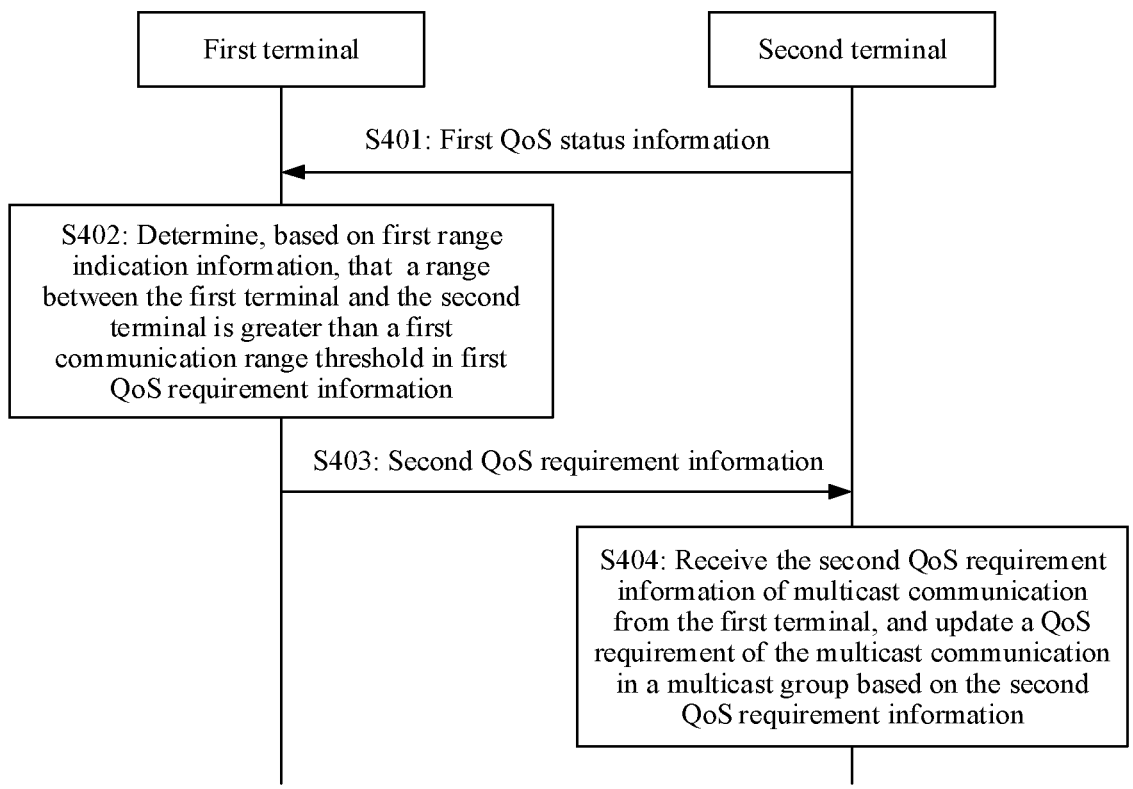
FIG. 4 is a schematic flowchart of a communication method according to an embodiment of this application.
Figure 5:
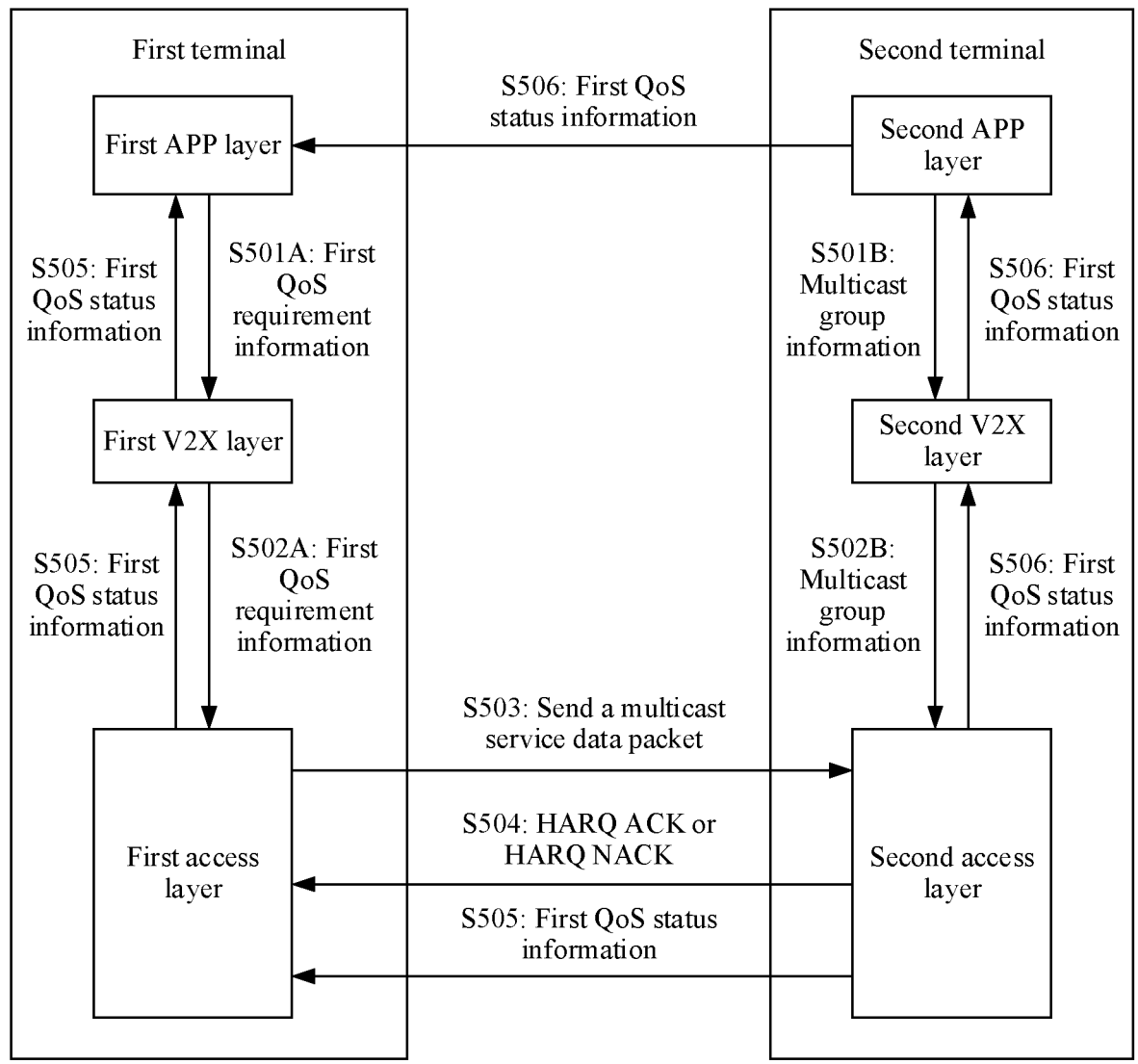
FIG. 5 is a schematic flowchart of a communication method according to an embodiment of this application.
Figure 6:
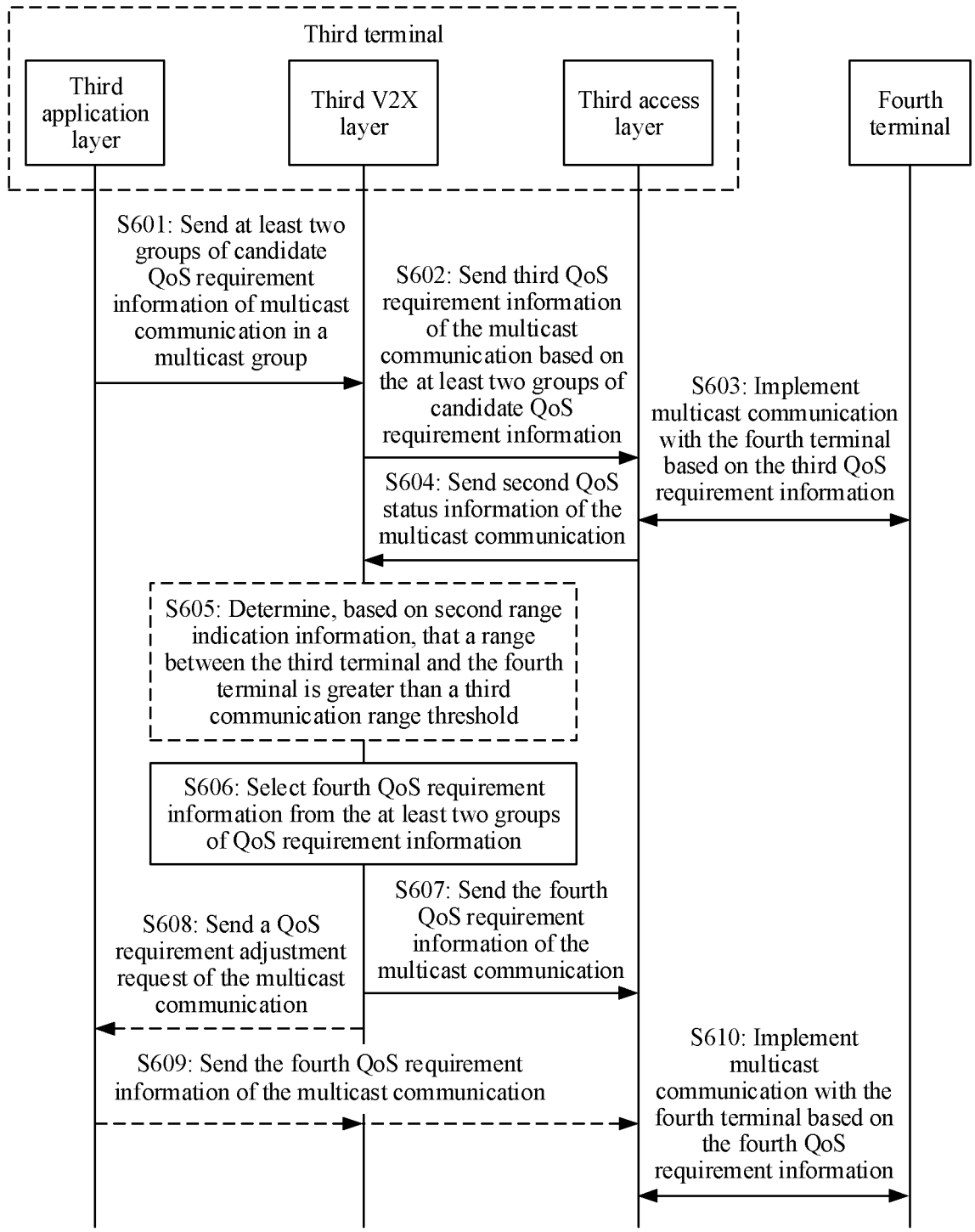
FIG. 6 is a schematic flowchart of a communication method according to an embodiment of this application.

The following describes in detail a communication method provided in embodiments of this application with reference to FIG. 4 to FIG. 6.

FIG. 4 is a schematic flowchart 1 of a communication method according to an embodiment of this application. The communication method is applicable to multicast communication between different terminals in the multicast group shown in FIG. 1 or FIG. 2.

The following uses the first terminal and the second terminal shown in FIG. 1 as an example. The first terminal may be a sending terminal in the multicast group, and the second terminal is any receiving terminal in the multicast group. The communication method shown in FIG. 4 is described in detail. As shown in FIG. 4, the communication method includes the following S401 to S404.

S401: The second terminal sends first QoS status information of multicast communication.

Correspondingly, the first terminal receives the first QoS status information of the multicast communication.

The first QoS status information includes first range indication information.

The first range indication information may be used for determining that a range between the first terminal and the second terminal is greater than a first communication range threshold in first QoS requirement information of the multicast communication in the multicast group. The first range indication information may include one or more of the following: an indication for out of range, location information of the second terminal, and the range between the first terminal and the second terminal.

The first QoS requirement information is QoS requirement information of the multicast communication in the multicast group, and may be used for indicating a QoS requirement for performing multicast communication in the multicast group. The QoS requirement may be referred to as a first QoS requirement.

The first communication range threshold is used for representing a maximum communication range that is between a sending terminal and a receiving terminal in the multicast group and that is corresponding to the first QoS requirement. For example, when a range between a sending terminal A and a receiving terminal B in the multicast group is greater than the first communication range threshold, multicast service data received by the receiving terminal B from the sending terminal A may not satisfy the first QoS requirement, further, may not satisfy a part or all requirements in the first QoS requirement.

The indication for out of range is used for indicating that the range between the first terminal and the second terminal is greater than the first communication range threshold.

The location information of the second terminal may be used for indicating a location of the second terminal. The location information may be geographical coordinates, for example, longitude and latitude, or a positioning value obtained by a global navigation satellite system (GNSS). Alternatively, the location information may be information about a location such as a cell, a base station, a service area, or a tracking area in which the second terminal is located. Correspondingly, the location information may be a cell identifier, a base station identifier, a service area identifier (SAI), a tracking area identifier (TAI), or the like.

Optionally, in an area covered by a network, the location information of the second terminal may alternatively be first reported to the network. For example, the location information of the terminal is reported to the network in a location update procedure, and then the network delivers the location information to all terminals in the multicast group.

It should be noted that, for location information of any other terminal mentioned in embodiments of this application, refer to related descriptions of the location information of the second terminal. Details are not described again.

Step S401 may be replaced with the following. When a range between the first terminal and the second terminal is greater than a first communication range threshold in first QoS requirement information, the second terminal sends first QoS status information of multicast communication to the first terminal.

For example, for any receiving terminal in the multicast group, for example, the second terminal, a feedback policy of the receiving terminal may be determined based on a maximum communication range that is of the multicast communication in the multicast group and that is corresponding to the first QoS requirement. For example, the maximum communication range may be the first communication range threshold. As shown in FIG. 1, if the range between the first terminal and the second terminal is less than the first communication range threshold, the second terminal sends, to the first terminal, feedback information such as a hybrid automatic repeat request (HARQ) acknowledgment (ACK) message or a HARQ negative ACK (NACK) message. If the range between the first terminal and the second terminal is greater than the first communication range threshold, the second terminal sends the first range indication information of the multicast communication to the first terminal.

S402: The first terminal determines, based on the first range indication information, that the range between the first terminal and the second terminal is greater than the first communication range threshold in the first QoS requirement information.

In a first possible implementation, it is assumed that the second terminal sends the location information of the second terminal to the first terminal in step S401. In this case, in step S402, the first terminal determines the range between the first terminal and the second terminal based on location information of the first terminal and the location information of the second terminal, and determines that the range is greater than the first communication range threshold.

In a second possible implementation, it is assumed that the second terminal sends the range between the first terminal and the second terminal to the first terminal in step S401. In this case, the first terminal determines whether the range is greater than the first communication range threshold in step S402.

The range may be determined by the second terminal based on the location information of the second terminal and location information of the first terminal. The first terminal may send the location information of the first terminal to the second terminal, so that the second terminal determines the range.

In a third possible implementation, it is assumed that the second terminal sends the indication for out of range to the first terminal in step S401. In this case, it may be learned, in step S402 based on the indication for out of range, that the range between the first terminal and the second terminal is greater than the first communication range threshold.

Further, after determining the range between the first terminal and the second terminal based on the location information of the second terminal and location information of the first terminal, the second terminal may not send the range to the first terminal, but determine whether the range is greater than the first communication range threshold in the QoS requirement information of the multicast communication in the multicast group. If the range is greater than the first communication range threshold, the second terminal sends the indication for out of range to the first terminal. For example, the indication for out of range may be 1-bit (bit) indication information. Certainly, the indication for out of range may alternatively be indication information in another form. This is not limited in embodiments of this application.

It should be noted that when the third possible implementation in S402 is used, step S402 may be omitted. In other words, S402 is an optional step.

It should be noted that, it is assumed that the first terminal does not send the location information of the first terminal to the second terminal. In this case, the second terminal may determine the range between the first terminal and the second terminal based on received signal strength (for example, receive power) of the first terminal. The range between the first terminal and the second terminal may be obtained by using the following formula:

$$d = P^{\alpha} \qquad \text{(formula 1)}$$

d represents the range (meter) between the first terminal and the second terminal, P represents the signal strength (milliwatt) of the first terminal received by the second terminal, and $\alpha$ represents a path loss parameter that is set based on different communication scenarios and that is greater than 0. For example, $\alpha$ may be 4.

In addition, the range between the first terminal and the second terminal may be a numeric value, or may be a range index or a range level that is in a one-to-one correspondence with the numeric value, or may be a channel quality index or level, a signal strength index or level, a signal quality index or level, or the like that is in a one-to-one correspondence with the range and that is used for indicating channel quality, signal strength, or signal quality. The channel quality, the signal strength, the signal quality, and the like may be measured by a terminal. A specific implementation of the range between the first terminal and the second terminal is not limited in embodiments of this application.

S403: The first terminal sends second QoS requirement information of the multicast communication.

The second QoS requirement information may be used for updating the QoS requirement of the multicast communication in the multicast group. The second QoS requirement information may be used for indicating a second QoS requirement.

The second QoS requirement information includes a second communication range threshold, and the second communication range threshold is greater than the first communication range threshold. The second communication range threshold is used for representing a maximum communication range that is between the sending terminal and the receiving terminal in the multicast group and that is corresponding to the second QoS requirement.

In addition, the second communication range threshold is less than a maximum allowed communication range or a maximum supported communication range of the multicast communication in the multicast group. When the range between the sending terminal A and the receiving terminal B in the multicast group is greater than the maximum allowed communication range or the maximum supported communication range, multicast communication in the multicast group cannot be performed between the sending terminal A and the receiving terminal B. In addition, the maximum allowed communication range or the maximum supported communication range may be sent by a network side device (for example, an application server) to the sending terminal.

It should be noted that the sending terminal in the multicast group may dynamically adjust the maximum communication range of multicast communication in the multicast group in the QoS requirement. The maximum communication range may be set to the first communication range threshold or the second communication range threshold. Further, the sending terminal may send the second QoS requirement information of the multicast communication to the receiving terminal in the multicast group by using a multicast service data packet.

It should be noted that when the third possible implementation is used in S402, step S402 may be omitted. In other words, S402 is an optional step. Correspondingly, step S403 may be replaced with the following. The first terminal sends second QoS requirement information of the multicast communication based on the indication for out of range.

S404: The second terminal receives the second QoS requirement information of the multicast communication from the first terminal, and updates the QoS requirement of the multicast communication in the multicast group based on the second QoS requirement information.

For example, as shown in FIG. 1, it is assumed that the first communication range threshold is a range threshold corresponding to the solid line in the figure, and the second communication range threshold is a range threshold corresponding to the dashed line in the figure. That is, the second communication range threshold is greater than the first communication range threshold. If the second terminal is located outside the area corresponding to the solid line shown in FIG. 1, in other words, the range between the first terminal and the second terminal is greater than the first communication range threshold, the first communication range threshold cannot satisfy a range requirement of the second terminal for the multicast communication in the multicast group. The second terminal includes the first range indication information in the first QoS status information sent to the first terminal. Correspondingly, the first terminal may adjust the first communication range threshold to the second communication range threshold (corresponding to the dashed line in FIG. 1) based on the first range indication information, and send the second communication range threshold to the second terminal, so that the second terminal implements the multicast communication in the multicast group based on the second communication range threshold.

Further, for any receiving terminal in the multicast group, for example, the second terminal, a feedback policy of the receiving terminal may be determined based on a maximum communication range that is of the multicast communication in the multicast group and that is corresponding to the second QoS requirement. For example, the maximum communication range may be the second communication range threshold. As shown in FIG. 1, if the range between the first terminal and the second terminal is less than the second communication range threshold, the second terminal sends feedback information such as a HARQ ACK or a HARQ NACK to the first terminal. If the range between the first terminal and the second terminal is greater than the second communication range threshold, the second terminal sends range indication information to the first terminal, where the range indication information may be used for determining that the range between the first terminal and the second terminal is greater than the second communication range threshold.

It should be noted that the second terminal may actually use a plurality of communication range thresholds. For example, the second QoS requirement information may include a plurality of communication range thresholds, for example, the first communication range threshold and the second communication range threshold. Alternatively, although the second QoS requirement information includes only one communication range threshold, for example, the second communication range threshold, the second terminal uses both the second communication range threshold in the second QoS requirement information and the first communication range threshold in the first QoS requirement information to determine feedback policies of receiving terminals located in different areas in the multicast group. It is assumed that the first communication range threshold and the second communication range threshold are still the first communication range threshold and the second communication range threshold that are shown in FIG. 1. In this case, a receiving terminal that is in the multicast group and a range between which and the first terminal is less than the first communication range threshold may not send any feedback information. A receiving terminal that is in the multicast group and a range between which and the first terminal is greater than the first communication range threshold and less than the second communication range threshold may send a HARQ ACK or a HARQ NACK to the first terminal. A receiving terminal that is in the multicast group and a range between which the first terminal is greater than the second communication range threshold may send the first range indication information of the multicast communication to the first terminal.

In current technology, when a range between a first terminal and a second terminal is greater than a maximum communication range in QoS requirement information of multicast communication in a multicast group, the second terminal does not feed back any information to the first terminal. In this case, the first terminal cannot adjust the QoS requirement information based on a current multicast communication status. Consequently, reliability of the multicast communication is poor. However, in this embodiment of this application, when the range between the first terminal and the second terminal is greater than the maximum communication range in the QoS requirement information of the multicast communication in the multicast group, the second terminal can send the first QoS status information of the multicast communication to the first terminal, so that the first terminal can update a QoS requirement parameter of the multicast communication based on the second communication range threshold used after the adjustment. In this way, adaptive adjustment of the QoS requirement of the multicast communication is implemented, and multicast communication quality can be adjusted. This can improve reliability of the multicast communication.

Optionally, in a possible design method of the foregoing embodiment, the second QoS requirement information may further include a second QoS requirement parameter, and a QoS requirement corresponding to the second QoS requirement parameter is lower than a QoS requirement corresponding to a first QoS requirement parameter. The second QoS requirement parameter is a QoS requirement after adjustment based on a QoS status of the current multicast communication, and can satisfy an actual communication requirement of the current multicast communication. This further improves reliability of the multicast communication. For example, the first QoS requirement parameter includes a first modulation and coding scheme (MCS), and the first MCS corresponds to a high bit rate. Because channel quality of the current multicast communication is poor, a bit error rate is high, and normal communication cannot be performed. In this case, the first terminal may adjust the first MCS with the high bit rate to a second MCS with a low bit rate, to ensure that the first terminal and the second terminal can continue communication at the low bit rate. This further improves reliability of the multicast communication.

It should be noted that the first communication range threshold may correspond to the first QoS requirement parameter, and the second communication range threshold may correspond to the second QoS requirement parameter. The QoS requirement corresponding to the first QoS requirement parameter is higher than the QoS requirement corresponding to the second QoS requirement parameter.

For example, the first terminal may receive a correspondence from a network side device (for example, an application server), where the correspondence may be a correspondence between a range threshold and a QoS requirement parameter. Further, the correspondence may include a correspondence between the first communication range threshold and the first QoS requirement parameter, and a correspondence between the second communication range threshold and the second QoS requirement parameter.

For example, the first communication range threshold is 500 meters, and a first QoS requirement parameter set {first packet loss rate, first delay, first bandwidth} corresponding to the first communication range threshold may be {0.01%, 50 milliseconds (ms), 40 megahertz (MHz)}. Correspondingly, the second communication range threshold is 1000 meters, and a second QoS requirement parameter set {second packet loss rate, second delay, second bandwidth} may be {1%, 100 ms, 20 MHz}. The second packet loss rate is greater than the first packet loss rate, the second delay is greater than the first delay, and the second bandwidth is less than the first bandwidth.

For example, the second QoS requirement parameter may include a second PQI, a second PC5 interface flow bit rate, and a second QoS requirement parameter set required for a current multicast service, for example, the second QoS requirement parameter set includes the second delay, the second packet loss rate, and the second bandwidth. Correspondingly, that a QoS requirement corresponding to the second QoS requirement parameter is lower than a QoS requirement corresponding to a first QoS requirement parameter may include one or more of the following. A QoS requirement corresponding to the second PC5 interface PQI is lower than a QoS requirement corresponding to a first PC5 interface PQI, the second PC5 interface flow bit rate is lower than a first PC5 interface flow bit rate, the second delay is greater than the first delay, the second packet loss rate is greater than the first packet loss rate, and the second bandwidth is less than the first bandwidth.

For example, the first QoS requirement parameter set {first packet loss rate, first delay, first bandwidth} included in the first QoS requirement parameter may be {0.01%, 50 ms, 40 MHz}. The second QoS requirement parameter set {second packet loss rate, second delay, second bandwidth} included in the second QoS requirement parameter may be {1%, 100 ms, 20 MHz}. The second packet loss rate is greater than the first packet loss rate, the second delay is greater than the first delay, and the second bandwidth is less than the first bandwidth. It is assumed that the second terminal detects one or more of the following. An actual packet loss rate is less than the first packet loss rate, an actual delay is less than the first delay, and an actual bandwidth is less than the first bandwidth. In this case, the first QoS status information of the multicast communication that is sent by the second terminal and that is received by the first terminal includes one or more of the foregoing detection results of the second terminal. In this way, the first terminal may adjust the first QoS requirement parameter set to the second QoS requirement parameter set. The actual packet loss rate is greater than the second packet loss rate, the actual delay is greater than the second delay, and the actual bandwidth is less than the second bandwidth.

Optionally, in a possible design method of the foregoing embodiment, the first QoS requirement information further includes a first QoS requirement parameter, and the first QoS status information may further include one or more unsatisfied QoS requirement parameters in the first QoS requirement parameter. The first QoS requirement parameter may include a first PQI, a first PC5 interface flow bit rate, and a first QoS requirement parameter set required for a current multicast service, for example, the first QoS requirement parameter set includes the first delay, the first packet loss rate, and the first bandwidth.

Optionally, in a possible design method of the foregoing embodiment, the first terminal may include a first application layer, a first V2X layer, and a first access layer. That the first terminal receives the first QoS status information of the multicast communication in S401 may include that the first application layer receives the first QoS status information of the multicast communication from an application server, or the first application layer receives the first QoS status information of the multicast communication from the second terminal through the first V2X layer and the first access layer.

Correspondingly, the second terminal may include a second application layer, a second V2X layer, and a second access layer. That the second terminal sends first QoS status information of multicast communication in S401 may include that the second application layer sends the first QoS status information of the multicast communication to the application server such as an AF network element, or the second application layer sends the first QoS status information of the multicast communication to the first terminal through the second V2X layer and the second access layer. For specific implementation, refer to a communication method shown in FIG. 5. Details are not described herein.

Optionally, in a possible design method of the foregoing embodiment, the first terminal includes a first application layer, a first V2X layer, and a first access layer, and the second terminal includes a second application layer, a second V2X layer, and a second access layer. That the first terminal sends the second QoS requirement information of the multicast communication in S403 may include one or more of the following. The first application layer sends the second QoS requirement information of the multicast communication to the first access layer through the first V2X layer, or the first application layer sends the second QoS requirement information of the multicast communication to the second terminal through the first V2X layer and the first access layer. Correspondingly, that the second terminal receives the second QoS requirement information of the multicast communication in S404 may include that the second application layer receives the second QoS requirement information of the multicast communication from the second terminal through the second V2X layer and the second access layer. For specific implementation, refer to the following communication method shown in FIG. 5. Details are not described herein.

Optionally, in an implementation scenario of the foregoing embodiment, before S401 is performed, multicast communication has already been performed between the first terminal and the second terminal based on the first QoS requirement information. In other words, the communication method shown in FIG. 4 may further include the following step 1 and step 2.

Step 1: The first terminal sends the first QoS requirement information of the multicast communication to the second terminal.

Correspondingly, the second terminal receives the first QoS requirement information of the multicast communication from the first terminal.

Step 2: The first terminal sends a multicast service data packet through a multicast channel.

Correspondingly, the second terminal receives the multicast service data packet from the first terminal.

The multicast channel is a radio resource used for transmitting multicast service data of the multicast group, for example, the multicast channel is a physical sidelink shared channel (PSSCH).

For example, in a process of PC5-based vehicle-to-vehicle direct communication, the first terminal may perform multicast communication by using a radio resource allocated by a network device to the first terminal or a resource selected by the first terminal from a radio resource pool preconfigured by the network device. The network device may be an access network element (for example, a base station), or may be a core network element, for example, the policy control function (PCF) network element or the application function (AF) network element in FIG. 2.

Further, when a PC5 interface is used for performing multicast communication, the first terminal may send the multicast service data packet through the PSSCH, and send, on a physical sidelink control channel (PSCCH) associated with the PSSCH, sidelink control information (SCI) used for receiving and decoding the PSSCH. The SCI may include the first QoS requirement information or the second QoS requirement information. In addition, the SCI may further include one or more of the following: PSSCH radio resource information carrying the multicast service data packet, the location information of the first terminal, and the like. Further, the second terminal may send feedback information on a physical sidelink feedback channel (PSFCH). The feedback information may be used for indicating whether the multicast service data packet carried on the PSSCH or the first QoS status information is received. For example, the feedback information may be an ACK or a NACK of a HARQ. The first terminal may adjust the QoS requirement information of the multicast communication in the multicast group based on the feedback information, to satisfy a QoS requirement for a multicast service of the first terminal.

Optionally, in an embodiment scenario of the foregoing embodiment, after S401 to S404 are performed, the method further includes implementing the multicast communication between the first terminal and the second terminal. To be specific, the communication method shown in FIG. 4 may further include the following step 3.

Step 3: The first terminal sends the multicast service data packet to the second terminal.

Correspondingly, the second terminal receives the multicast service data packet from the first terminal.

For specific implementation, refer to related content in step 2. Details are not described herein again.

It should be noted that any one of the foregoing terminals may include an application layer, a V2X layer, and an access layer. For example, the first terminal includes a first application layer, a first V2X layer, and a first access layer, and the second terminal includes a second application layer, a second V2X layer, and a second access layer. The following further describes the communication method shown in FIG. 4 with reference to a protocol layer in a terminal.

The following describes in detail the communication method shown in FIG. 4 by using an example in which the first terminal and the second terminal shown in FIG. 1 each include an application layer, a V2X layer, and an access layer. For details, refer to the communication method shown in FIG. 5.

FIG. 5 is a schematic flowchart 2 of a communication method according to an embodiment of this application. The communication method is a specific example of the communication method shown in FIG. 4 at a granularity of the protocol layer of the terminal. As shown in FIG. 5, the communication method includes the following steps.

S501A: A first application layer sends first QoS requirement information of multicast communication to a first V2X layer.

Correspondingly, the first V2X layer receives the first QoS requirement information of the multicast communication from the first application layer.

For content of the first QoS requirement information, refer to related descriptions in the embodiment shown in FIG. 4. Details are not described herein again.

Optionally, in addition to the first QoS requirement information, the first application layer may further send multicast group information to the first V2X layer. Correspondingly, the first V2X layer receives the multicast group information from the first application layer.

The multicast group information may include at least one of the following: a multicast group identifier, a group member identifier, a quantity of group members, a destination layer-2 (L2) identifier, and the like. The multicast group identifier is used for distinguishing between different multicast groups, and may include a group identifier, an internet protocol address, a media access control (MAC) address, and the like of a multicast group. The group member identifier is used for distinguishing different terminals in the multicast group, and may include a user name, an IP address, a MAC address, and the like of any terminal in the multicast group. The quantity of group members is a quantity of members included in the multicast group, and is usually a positive integer greater than or equal to 3. The destination layer-2 identifier is a MAC address of a receiving terminal in the multicast group. It should be noted that S501A is an optional step. To be specific, the first application layer may alternatively not send the multicast group information and the first QoS requirement information to the first V2X layer. In this case, step S501A may be replaced with the following. A first V2X layer obtains multicast group information and first QoS requirement information based on a V2X application/service type carried in a multicast service data packet from a first application layer.

The V2X application/service type may be a provider service identifier (PSID), an intelligent transportation system (ITS)-application identifier (AID), or other information that can indicate a specific V2X application/service type.

For example, the first V2X layer may query a correspondence based on the V2X application/service type carried in the multicast service data packet, to obtain the multicast group information and the first QoS requirement information. The correspondence may include one or more of the following: a correspondence between a V2X application/service type and a destination L2 identifier that is in multicast group information, a correspondence between a V2X application/service type and a QoS requirement parameter, and a correspondence between a V2X application/service type and a maximum communication range. A parameter set including a QoS requirement parameter and a maximum communication range that correspond to a same V2X application/service type may be the first QoS requirement information or second QoS requirement information.

In this embodiment of this application, the first terminal may obtain the foregoing correspondence in the following manners.

Manner 1: When the first terminal applies to a wireless network for using PC5 V2X communication, a PCF network element or an AF network element in the wireless network may send policies and parameters (where the parameters include the foregoing correspondence, and may further include geographical location information, frequency band information, and the like that allow PC5 communication) that are used for PC5 communication to the first terminal.

Further, as shown in FIG. 2, the PCF network element may send these policies and parameters to the first terminal through an N1 interface of an access and mobility management function (AMF) network element.

Manner 2: The AF network element sends policies and parameters (where the parameters include the foregoing correspondence, and may further include geographical location information, frequency band information, and the like that allow PC5 communication) that are used for PC5 communication to a UDR network element. The UDR network element stores the policies and the parameters. Then, the PCF network element may read the policies and the parameters from the UDR network element, and send the policies and the parameters to the first terminal through an N1 interface of an AMF network element.

Manner 3: The AF network element directly sends policies and parameters (where the parameters include the foregoing correspondence, and may further include geographical location information, frequency band information, and the like that allow PC5 communication) that are used for PC5 communication to the first terminal through a V1 interface.

S502A: The first V2X layer sends the first QoS requirement information of the multicast communication to a first access layer.

Correspondingly, the first access layer receives the first QoS requirement information of the multicast communication from the first V2X layer.

In a possible design method, the first V2X layer may directly deliver the first QoS requirement information to the first access layer.

In another possible design method, based on the multicast group information such as an application/service type, the first V2X layer may also query the correspondences for specific content of the first QoS requirement information such as a corresponding QoS requirement parameter and a maximum communication range threshold, and the multicast group information such as a destination L2 identifier of the multicast communication. Then, the first V2X layer delivers the specific content of the first QoS requirement information and the multicast group information to the first access layer. For a specific query method, refer to related descriptions in S501A. Details are not described herein again.

S501B: A second application layer sends the multicast group information to a second V2X layer.

Correspondingly, the second V2X layer receives the multicast group information from the second application layer.

S502B: The second V2X layer sends the multicast group information to a second access layer.

Correspondingly, the second access layer receives the multicast group information from the second V2X layer.

The second terminal used as a receiving terminal of the multicast service data packet is different from the first terminal used as a sending terminal of the multicast service data packet. The application layer of the second terminal sends the multicast group information to the access layer of the second terminal through the V2X layer of the second terminal.

It should be noted that the first QoS requirement information may be obtained by the second access layer by parsing SCI information carried on a PSCCH corresponding to a PSSCH carrying the multicast service data packet. For details, refer to an existing implementation. Details are not described herein.

S503: The first access layer sends the multicast service data packet to the second access layer.

For example, the first access layer encodes the data packet based on a PQI value in the QoS requirement information by using a modulation and coding scheme preset by a network or a device, and sends the encoded data packet.

Correspondingly, the second access layer receives the multicast service data packet from the first access layer.

For example, the second access layer may parse, based on the PQI value in the QoS requirement information, the modulation and coding scheme carried on the PSCCH, and demodulate and decode the data packet according to the modulation and coding scheme, to obtain content of the data packet.

S504: The second access layer sends a HARQ ACK or a HARQ NACK to the first access layer.

Correspondingly, the first access layer receives the HARQ ACK or the HARQ NACK from the second access layer.

Further, S504 may include that the second access layer may determine whether a range between the first terminal and the second terminal is greater than a first communication range threshold in the first QoS requirement information, and determine, based on a determining result, to send feedback information to the first access layer. For example, if the range between the first terminal and the second terminal is less than the first communication range threshold in the first QoS requirement information, and the multicast service data packet fails to be parsed, the second access layer may send the HARQ NACK to the first access layer. If the range between the first terminal and the second terminal is greater than the first communication range threshold in the first QoS requirement information, and the multicast service data packet is successfully parsed, the second access layer may send the HARQ ACK to the first access layer.

It should be understood that a feedback mechanism used by the second access layer, for example, whether to feed back the HARQ ACK or the HARQ NACK, may be preset. This is not limited in embodiments of this application.

S505: The second access layer sends first QoS status information of the multicast communication to the first access layer.

Correspondingly, the first access layer receives the first QoS status information of the multicast communication, and sends the first QoS status information of the multicast communication to the first application layer through the first V2X layer.

In an example, that the second access layer sends first QoS status information of the multicast communication to the first access layer in S505 may include the following. If determining that the range between the first terminal and the second terminal is greater than the first communication range threshold in the first QoS requirement information, the second access layer sends the first QoS status information of the multicast communication to the first access layer.

It should be noted that even if the range between the first terminal and the second terminal is greater than the first communication range threshold in the first QoS requirement information, the second access layer may still successfully parse the multicast service data packet. In addition, even if the range between the first terminal and the second terminal is less than the first communication range threshold in the first QoS requirement information, the second access layer may still fail to parse the multicast service data packet. Therefore, in another example, that the second access layer sends first QoS status information of the multicast communication to the first access layer in step S505 may include the following. If the range between the first terminal and the second terminal is greater than the first communication range threshold in the first QoS requirement information, and the multicast service data packet fails to be parsed, the second access layer sends the first QoS status information of the multicast communication to the first access layer. If the range between the first terminal and the second terminal is less than the first communication range threshold in the first QoS requirement information, and the multicast service data packet is successfully parsed, the second access layer does not send the first QoS status information of the multicast communication. In this example, the foregoing range determining result and parsing result of the multicast service data packet are combined, so that accuracy of adjusting a QoS requirement of the multicast communication by the first terminal can be further improved.

S506: The second access layer sends the first QoS status information of the multicast communication to the second application layer through the second V2X layer, and the second application layer sends the first QoS status information of the multicast communication to the first application layer.

Further, that the second access layer sends the first QoS status information of the multicast communication to the second V2X layer in S506 may include the following. If determining that the range between the first terminal and the second terminal is greater than the first communication range threshold in the first QoS requirement information, the second access layer sends the first QoS status information of the multicast communication to the second V2X layer. For a specific determining method, refer to the embodiment shown in FIG. 4. Details are not described herein again.

Further, that the second application layer sends the first QoS status information of the multicast communication to the first application layer in S506 may include that the second application layer sends the first QoS status information of the multicast communication to an application server or an AF network element through a V1 interface. Then, the application server (which may be an application server deployed by a third party, or an AF network element deployed by an operator) sends the first QoS status information of the multicast communication to the first application layer via a UPF network element and a next generation (radio) access network (NG-(R)AN) network element.

After S505 or S506 is performed, the method may further include that the first application layer generates the second QoS requirement information. For details, refer to related content in the embodiment shown in FIG. 4. Details are not described herein again.

Then, the first application layer may perform S501A, S502A, and S503 again, to deliver the second QoS requirement information to the first access layer through the first V2X layer, and then the first access layer sends the second QoS requirement information to the second access layer by using a multicast service data packet. In this way, multicast communication quality can be dynamically adjusted.

Based on the communication method shown in FIG. 4 or FIG. 5, the first terminal can learn, based on the first range indication information provided by the second terminal, that the range between the first terminal and the second terminal is greater than the first communication range threshold, and accordingly adjust the maximum communication range of the multicast communication in the multicast group from the first communication range threshold to the second communication range threshold. The second communication range threshold is greater than the first communication range threshold. This can resolve a problem that the QoS requirement information of the multicast communication cannot be adjusted because a multicast communication status between terminals whose actual range is greater than the maximum communication range in the QoS requirement information of the multicast communication in the multicast group cannot be obtained. This can improve reliability of the multicast communication.

It should be noted that, in the communication method shown in FIG. 4 or FIG. 5, an example in which the first application layer is used as a subject of adjusting the QoS requirement information of the multicast communication is used for description. In another possible design method, the first V2X layer may alternatively be used as a subject of adjusting the QoS requirement information of the multicast communication. Details are described below.

FIG. 6 is a schematic flowchart 3 of a communication method according to an embodiment of this application. The communication method is applicable to any terminal in the multicast group shown in FIG. 1 or FIG. 2, for example, the third terminal in FIG. 1. Multicast communication may be performed between the any terminal and another terminal in the multicast group, for example, a fourth terminal (not shown in FIG. 1). The any terminal includes an application layer, a V2X layer, and an access layer. For example, the third terminal includes a third application layer, a third V2X layer, and a third access layer. The following uses the third terminal shown in FIG. 1 as an example to describe in detail the communication method shown in FIG. 6.

As shown in FIG. 6, the communication method includes the following steps.

S601: A third application layer sends at least two groups of candidate QoS requirement information of multicast communication in a multicast group to a third V2X layer. Correspondingly, the third V2X layer receives the at least two groups of candidate QoS requirement information of the multicast communication in the multicast group from the third application layer.

For content of each group of candidate QoS requirement information, refer to the content of the foregoing first QoS requirement information. Details are not described herein again.

S602: The third V2X layer sends third QoS requirement information of the multicast communication to a third access layer based on the at least two groups of candidate QoS requirement information. Correspondingly, the third access layer receives the third QoS requirement information of the multicast communication from the third V2X layer.

The third QoS requirement information includes a third communication range threshold.

Optionally, the third QoS requirement information may further include a third QoS requirement parameter. For example, the third QoS requirement parameter may include one or more of the following: a third PQI, a third PC5 interface flow bit rate, and a third QoS requirement parameter set required by a current multicast service, for example, the third QoS requirement parameter set includes a third delay, a third packet loss rate, and a third bandwidth.

In a possible design method, the communication method shown in FIG. 6 may further include that the third V2X layer receives a selection indication from the third application layer. The selection indication is used for indicating the third V2X layer to select one group of QoS requirement information from the at least two groups of candidate QoS requirement information. In other words, the third application layer may explicitly indicate the third V2X layer to select one group from the at least two groups of candidate QoS requirement information as the third QoS requirement information, and deliver the third QoS requirement information to the third access layer.

In another possible design method, the third application layer may alternatively not deliver a selection indication. In other words, if there are a plurality of groups of candidate QoS requirement information delivered by the third application layer to the third V2X layer, it may be considered that the third application layer has delivered the selection indication. In other words, the third application layer may alternatively implicitly indicate, by using the at least two groups of candidate QoS requirement information, the third V2X layer to select one group from the at least two groups of candidate QoS as the third QoS requirement information, and deliver the third QoS requirement information to the third access layer.

S603: The third access layer implements multicast communication with a fourth terminal based on the third QoS requirement information.

In a possible design method, the third terminal may be a sending terminal, the fourth terminal is a receiving terminal. The third QoS requirement information is used by the third access layer to send a multicast service data packet to the fourth terminal and receive feedback information or second QoS status information from the fourth terminal.

Alternatively, in another possible design method, the third terminal may be a receiving terminal, the fourth terminal is a sending terminal. The third QoS requirement information is used by the third access layer to receive a multicast service data packet from the fourth terminal and send feedback information or second QoS status information to the fourth terminal.

In other words, the third terminal may be the sending terminal in the multicast group, or may be the receiving terminal in the multicast group. This is not limited in this embodiment of this application.

For a specific implementation of the multicast communication, refer to related content of the method embodiment shown in FIG. 4. Details are not described herein again.

S604: The third access layer sends the second QoS status information of the multicast communication to the third V2X layer. Correspondingly, the third V2X layer receives the second QoS status information of the multicast communication from the third access layer.

In a possible design method, the third terminal may be the sending terminal, the fourth terminal is the receiving terminal, and the second QoS status information may be QoS status information that is from an access layer of the fourth terminal and that is received by the third access layer.

Alternatively, in another possible design method, the third terminal may be the receiving terminal, the fourth terminal is the sending terminal, and the second QoS status information may be QoS status information obtained through measurement by the third access layer.

The second QoS status information includes second range indication information, and the second range indication information is used for determining that a range between the third terminal and the fourth terminal is greater than the third communication range threshold. For example, the second range indication information may include one or more of the following: an indication for out of range, location information of the fourth terminal, and the range between the third terminal and the fourth terminal. The indication for out of range is used for indicating that the range between the third terminal and the fourth terminal is greater than the third communication range threshold. For specific content of the second range indication information, refer to the foregoing first range indication information. Details are not described herein again.

It should be noted that if the second range indication information does not include the indication for out of range, for example, includes only the location information of the fourth terminal or the range between the third terminal and the fourth terminal, the communication method shown in FIG. 6 may further include S605.

S605: The third V2X layer determines, based on the second range indication information, that the range between the third terminal and the fourth terminal is greater than the third communication range threshold.

For example, the third V2X layer may determine whether the range between the third terminal and the fourth terminal in the second range indication information is greater than the third communication range threshold, to learn that the range between the third terminal and the fourth terminal is greater than the third communication range threshold. Alternatively, the third V2X layer may calculate, based on the location information of the fourth terminal in the second range indication information, the range between the third terminal and the fourth terminal with reference to location information of the third terminal. Then, the third V2X layer determines whether the range is greater than a third communication range, to learn that the range is greater than the third communication range threshold.

To be specific, in the communication method shown in FIG. 6, the operation of determining, based on the second range indication information, that the range between the third terminal and the fourth terminal is greater than the third communication range threshold may be performed by the fourth terminal, and the fourth terminal notifies the third terminal of a determining result (the indication for out of range). Alternatively, the third terminal may perform determining by itself based on the range between the third terminal and the fourth terminal provided by the fourth terminal or the location information of the fourth terminal. In other words, S605 may be considered as an optional step.

S606: The third V2X layer selects fourth QoS requirement information from the at least two groups of QoS requirement information.

The fourth QoS requirement information includes a fourth communication range threshold, and the fourth communication range threshold is greater than the third communication range threshold. For a value relationship between the fourth communication range threshold and the third communication range threshold, refer to a value relationship between the second communication range threshold and the first communication range threshold in S402. Details are not described herein again.

In a possible design method, the fourth QoS requirement information may further include a fourth QoS requirement parameter, and a QoS requirement corresponding to the fourth QoS requirement parameter is lower than a QoS requirement corresponding to the third QoS requirement parameter.

For example, the fourth QoS requirement parameter may include one or more of the following: a fourth PQI, a fourth PC5 interface flow bit rate, and a fourth QoS requirement parameter set required by the current multicast service, for example, the fourth QoS requirement parameter set includes a fourth delay, a fourth packet loss rate, and a fourth bandwidth. Correspondingly, that a QoS requirement corresponding to the fourth QoS requirement parameter is lower than a QoS requirement corresponding to the third QoS requirement parameter may include one or more of the following. A QoS requirement corresponding to the fourth PC5 interface PQI is lower than a QoS requirement corresponding to the third PC5 interface PQI, the fourth PC5 interface flow bit rate is lower than the third PC5 interface flow bit rate, the fourth delay is greater than the third delay, the fourth packet loss rate is greater than the third packet loss rate, and the fourth bandwidth is less than the third bandwidth.

Further, the third terminal may select the fourth QoS requirement information from the at least two groups of candidate QoS requirement information in each of the following scenarios based on whether the third terminal is a sending terminal or a receiving terminal and a quantity of pieces of second QoS status information.

Scenario 1: The third terminal is the receiving terminal, and the second QoS status information is QoS status information measured by the third access layer and reported to the third V2X layer, in other words, the second QoS status information includes only QoS status information between the receiving terminal and one sending terminal, namely, the third terminal. In this case, the third V2X layer may select, from the at least two groups of candidate QoS requirement information, one group of candidate QoS requirement information that can satisfy a QoS requirement between the third terminal and the sending terminal as the fourth QoS requirement information, and deliver the fourth QoS requirement information to the third access layer, that is, perform the following S607.

Scenario 2: The third terminal is the sending terminal, and there is one piece of second QoS status information received by the third V2X layer, in other words, only one receiving terminal sends the second QoS status information of the multicast communication to the third terminal. In this case, the third V2X layer may select, from the at least two groups of candidate QoS requirement information, one group of candidate QoS requirement information that can satisfy a QoS requirement between the third terminal and the receiving terminal as the fourth QoS requirement information, and deliver the fourth QoS requirement information to the third access layer, that is, perform the following S607.

Scenario 3: The third terminal is a sending terminal, and there is a plurality of pieces of second QoS status information received by the third V2X layer, in other words, there are a plurality of receiving terminals that send the second QoS status information of the multicast communication to the third terminal. The third V2X layer may select, from the at least two groups of candidate QoS requirement information, one group of candidate QoS requirement information that can satisfy QoS requirements of all the receiving terminals as the fourth QoS requirement information, and send the fourth QoS requirement information to the third access layer. In other words, optionally, the communication method shown in FIG. 6 further includes the following S607. For detailed content of S607, refer to the following embodiment. Details are not described herein again.

That "can satisfy QoS requirements of all the receiving terminals" may include that the fourth communication range threshold is greater than maximum communication ranges required by all the receiving terminals. For example, the fourth communication range threshold may be a maximum value of the maximum communication ranges required by all the receiving terminals. For example, if maximum communication ranges required by three receiving terminals are 500 meters, 600 meters, and 1000 meters, a fourth communication range may be 1000 meters, or may be a range greater than 1000 meters, for example, 1200 meters.

The QoS requirement corresponding to the fourth QoS requirement parameter is lower than a lowest requirement in QoS requirements corresponding to all third QoS requirement parameters required by the receiving terminals. For example, minimum delays required by the three receiving terminals are 50 ms, 60 ms, and 80 ms. In this case, the fourth delay may be 80 ms, or may be a delay value greater than 80 ms, for example, 100 ms.

Scenario 4: The third terminal is a sending terminal, and there is a plurality of pieces of second QoS status information received by the third V2X layer, in other words, there are a plurality of receiving terminals that send the second QoS status information of the multicast communication to the third terminal. In addition, the third V2X layer finds that the at least two groups of candidate QoS requirement information do not include a group of candidate QoS requirement information that can satisfy QoS requirements of all the receiving terminals. In this case, the third V2X layer may send an unsatisfied QoS requirement parameter to the third application layer, and the third application layer determines whether to adjust QoS requirement information, and determines which group of candidate QoS requirement information is to be selected from the at least two groups of candidate QoS requirement information as the fourth QoS requirement information. That is, optionally, the communication method shown in FIG. 6 may further include the following S608 and S609. For detailed content of S608 and S609, refer to the following embodiment. Details are not described herein again.

S607: The third V2X layer sends the fourth QoS requirement information of the multicast communication to the third access layer. Correspondingly, the third access layer receives the fourth QoS requirement information of the multicast communication from the third V2X layer.

The fourth QoS requirement information may be used for replacing the previous third QoS requirement information, and is used for communication between the third terminal and another terminal in the multicast group, for example, the fourth terminal.

S608: The third V2X layer sends a QoS requirement adjustment request of the multicast communication to the third application layer. Correspondingly, the third application layer receives the QoS requirement adjustment request of the multicast communication from the third V2X layer.

The QoS requirement adjustment request carries the following information: a maximum communication range and/or a QoS requirement parameter, an index of a maximum communication range and/or an index of a QoS requirement parameter, an index of a maximum communication range and/or a QoS requirement parameter, or an index of a maximum communication range and/or a QoS requirement parameter corresponding to a QoS requirement that cannot be satisfied in QoS requirements of one or more receiving terminals. In addition, optionally, the QoS requirement adjustment request further carries identity information of a receiving terminal of at least one QoS requirement that cannot be satisfied. For example, the identity information is a terminal identifier.

It should be noted that, for different receiving terminals, QoS requirement information that cannot be satisfied may be different. For example, the third communication range threshold is less than a maximum communication range threshold required by a receiving terminal 1, and the third bandwidth is less than a system bandwidth required by a receiving terminal 2.

In a possible design method, the third application layer may determine not to adjust a QoS requirement. To be specific, the third terminal continues to implement multicast communication with the fourth terminal based on the third QoS requirement information.

In another possible design method, the third application layer may determine to adjust a QoS requirement, and select one group of candidate QoS requirement information from the at least two groups of candidate QoS requirement information as the fourth QoS requirement information. In this case, the at least two groups of candidate QoS requirement information do not include candidate QoS requirement information that can satisfy QoS requirements of all the receiving terminals. Therefore, the third application layer may select one group of candidate QoS requirement information from the at least two groups of candidate QoS requirement information as the fourth QoS requirement information according to one or more of the following rules.

A QoS requirement that can be satisfied by a largest quantity of parameters, a largest quantity of receiving terminals and that preferentially ensures a high-priority is satisfied.

S609: The third application layer sends the fourth QoS requirement information of the multicast communication to the third access layer through the third V2X layer. Correspondingly, the third access layer receives the fourth QoS requirement information of the multicast communication from the third application layer through the third V2X layer.

It should be noted that, after S607 or S609 is performed, update of QoS requirement information is completed. To be specific, the third QoS requirement information is adjusted to the fourth QoS requirement information. Then, the following S610 may be performed.

S610: The third access layer implements multicast communication with the fourth terminal based on the fourth QoS requirement information.

For specific implementation, refer to S603. Details are not described herein again.

Figure 7:
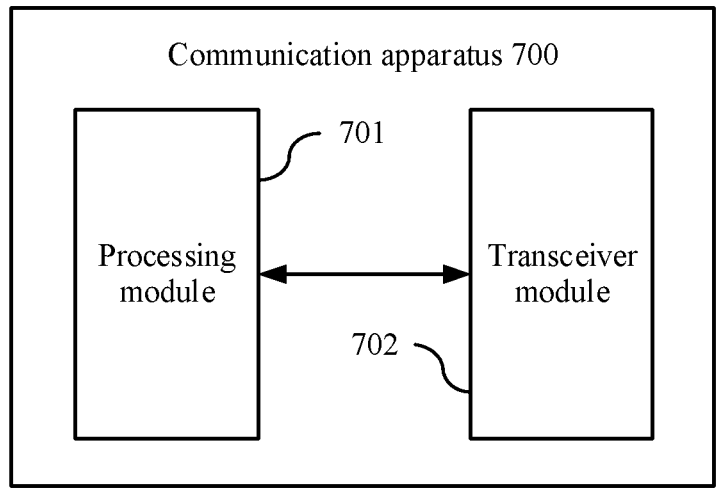
FIG. 7 is a schematic diagram of a structure of a communication apparatus according to an embodiment of this application.

According to the communication method shown in FIG. 6 or FIG. 7, a V2X layer of any terminal such as the third terminal in the multicast group can learn, based on the second range indication information provided by an access layer of the third terminal, that the range between the third terminal and the fourth terminal in the multicast group is greater than the third communication range threshold in QoS requirement information of the multicast communication in the multicast group. Accordingly, the third terminal selects one group from the at least two groups of candidate QoS requirement information configured by an application layer of the third terminal as the fourth QoS requirement information, and delivers the fourth QoS requirement information to the access layer of the third terminal, so that the third terminal can implement multicast communication with the fourth terminal in the multicast group based on the fourth QoS requirement information. The fourth QoS requirement information includes the fourth communication range, and the fourth communication range is greater than the third communication range. In this way, dynamic adjustment of a QoS requirement of the multicast communication is implemented, and multicast communication quality can be adjusted. This can improve reliability of the multicast communication.

It should be noted that in the communication method shown in any one of FIG. 4 to FIG. 6, there is usually one sending terminal, and there may be one or more receiving terminals. A quantity of receiving terminals is not limited in embodiments of this application.

The communication methods provided in embodiments of this application are described above in detail with reference to FIG. 4 to FIG. 6. The following describes in detail two other communication apparatuses provided in embodiments of this application with reference to FIG. 7 and FIG. 8.

FIG. 7 is a schematic diagram 2 of a structure of a communication apparatus according to an embodiment of this application. The communication apparatus belongs to a multicast group. The communication apparatus may be used as a first terminal to communicate with a second terminal in the multicast group. In other words, the communication apparatus may be configured to perform functions of the first terminal in the foregoing method embodiments. Alternatively, the communication apparatus may be used as a second terminal to communicate with a first terminal in the multicast group. In other words, the communication apparatus may perform functions of the second terminal in the foregoing method embodiments. Details are separately described below.

In some embodiments, the communication apparatus is applicable to the communication system shown in FIG. 1 or FIG. 2, and may perform functions of the first terminal in the communication method shown in FIG. 4 or FIG. 5. For ease of description, FIG. 7 shows only main components of the communication apparatus.

As shown in FIG. 7, the communication apparatus 700 includes a processing module 701 and a transceiver module 702.

The transceiver module 702 is configured to receive first QoS status information of multicast communication, where the first QoS status information includes first range indication information.

The processing module 701 is configured to determine, based on the first range indication information, that a range between the communication apparatus 700 and the second terminal is greater than a first communication range threshold in first QoS requirement information.

The transceiver module 702 is further configured to send second QoS requirement information of the multicast communication, where the second QoS requirement information includes a second communication range threshold, and the second communication range threshold is greater than the first communication range threshold.

For example, the first range indication information may include one or more of the following: an indication for out of range, location information of the second terminal, and the range between the communication apparatus 700 and the second terminal. The indication for out of range is used for indicating that the range between the communication apparatus 700 and the second terminal is greater than the first communication range threshold.

In a possible design, the first QoS requirement information may further include a first QoS requirement parameter. The first QoS status information may further include an unsatisfied QoS requirement parameter in the first QoS requirement parameter. The second QoS requirement information may include a second QoS requirement parameter. A QoS requirement corresponding to the second QoS requirement parameter is lower than a QoS requirement corresponding to the first QoS requirement parameter.

For example, the first QoS requirement parameter may include a first PQI, the second QoS requirement parameter may include a second PQI, and a QoS requirement corresponding to the second PC5 interface PQI is lower than a QoS requirement corresponding to the first PC5 interface PQI.

For example, the first QoS requirement parameter may include a first PC5 interface flow bit rate, the second QoS requirement parameter may include a second PC5 interface flow bit rate, and the second PC5 interface flow bit rate is lower than the first PC5 interface flow bit rate.

In a possible design, the communication apparatus 700 shown in FIG. 7 includes a first application layer, a first V2X layer, and a first access layer. The first application layer is configured to receive the first QoS status information of the multicast communication from an application server. The first application layer is further configured to receive the first QoS status information of the multicast communication from the second terminal through the first V2X layer and the first access layer.

In a possible design, the communication apparatus 700 shown in FIG. 7 includes a first application layer, a first V2X layer, and a first access layer. The first application layer is configured to send the second QoS requirement information of the multicast communication to the first access layer through the first V2X layer. The first application layer is further configured to send the second QoS requirement information of the multicast communication to the second terminal through the first V2X layer and the first access layer.

In some other embodiments, the communication apparatus 700 shown in FIG. 7 may alternatively be applicable to the communication system shown in FIG. 1 or FIG. 2, and may perform functions of the second terminal in the communication method shown in FIG. 4 or FIG. 5. Details are described below.

The transceiver module 702 is configured to send first QoS status information of multicast communication, where the first QoS status information includes first range indication information.

The processing module 701 is configured to determine, based on the first range indication information, that a range between the first terminal and the communication apparatus 700 is greater than a first communication range threshold in first QoS requirement information.

The transceiver module 702 is further configured to receive second QoS requirement information of the multicast communication, where the second QoS requirement information includes a second communication range threshold, and the second communication range threshold is greater than the first communication range threshold.

For example, the first range indication information may include one or more of the following: an indication for out of range, location information of the communication apparatus 700, and the range between the first terminal and the communication apparatus 700. The indication for out of range is used for indicating that the range between the first terminal and the communication apparatus 700 is greater than the first communication range threshold.

In a possible design, the first QoS requirement information may further include a first QoS requirement parameter. The first QoS status information may further include an unsatisfied QoS requirement parameter in the first QoS requirement parameter. The second QoS requirement information may include a second QoS requirement parameter. A QoS requirement corresponding to the second QoS requirement parameter is lower than a QoS requirement corresponding to the first QoS requirement parameter.

For example, the first QoS requirement parameter may include a first PQI, the second QoS requirement parameter may include a second PQI, and a QoS requirement corresponding to the second PC5 interface PQI is lower than a QoS requirement corresponding to the first PC5 interface PQI.

For example, the first QoS requirement parameter may include a first PC5 interface flow bit rate, the second QoS requirement parameter may include a second PC5 interface flow bit rate, and the second PC5 interface flow bit rate is lower than the first PC5 interface flow bit rate.

In a possible design, the communication apparatus 700 shown in FIG. 7 includes a second application layer, a second V2X layer, and a second access layer. The second application layer is configured to send the first QoS status information of the multicast communication to an application server. The second application layer is further configured to send the first QoS status information of the multicast communication to the first terminal through the second V2X layer and the second access layer.

In a possible design, the communication apparatus 700 shown in FIG. 7 includes a second application layer, a second V2X layer, and a second access layer. The second application layer is further configured to receive the second QoS requirement information of the multicast communication from the first terminal through the second V2X layer and the second access layer.

Optionally, the communication apparatus 700 shown in FIG. 7 may further include a storage module (not shown in FIG. 7). The storage module stores a program or instructions. When the processing module 701 executes the program or the instructions, the communication apparatus 700 shown in FIG. 7 is enabled to perform functions of the first terminal or the second terminal in the communication method shown in FIG. 4 or FIG. 5.

It should be noted that the communication apparatus 700 shown in FIG. 7 may be any terminal in the multicast group, or may be a chip or a chip system disposed in the terminal. This is not limited in this application.

For technical effects of the communication apparatus 700 shown in FIG. 7, refer to technical effects of the communication method shown in FIG. 4 or FIG. 5. Details are not described herein again.

Figure 8:
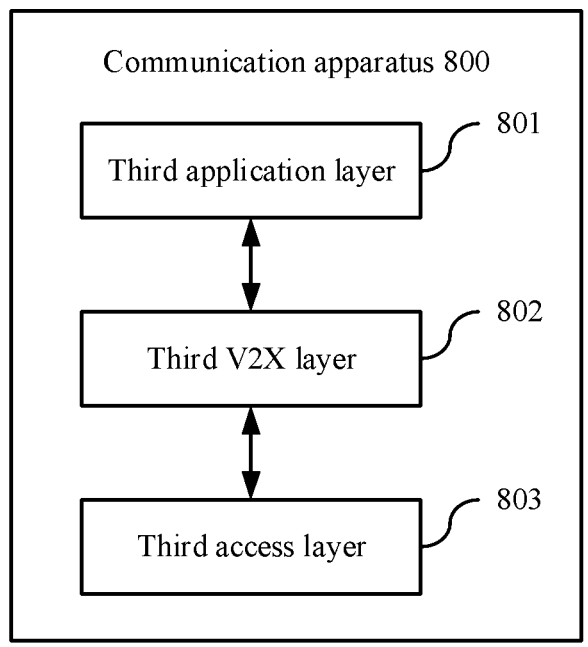
FIG. 8 is a schematic diagram of a structure of a communication apparatus according to an embodiment of this application.

FIG. 8 is a schematic diagram 3 of a structure of a communication apparatus according to an embodiment of this application. The communication apparatus is applicable to the communication system shown in FIG. 1 or FIG. 2, and may perform functions of the third terminal in the communication method shown in FIG. 6. The communication apparatus belongs to a multicast group, and the multicast group further includes another terminal. For ease of description, FIG. 8 shows only main components of the communication apparatus.

As shown in FIG. 8, the communication apparatus 800 includes a third application layer 801, a third V2X layer 802, and a third access layer 803.

The third V2X layer 802 is configured to receive at least two groups of candidate QoS requirement information of multicast communication in the multicast group from the third application layer 801. The third V2X layer 802 is further configured to send third QoS requirement information of the multicast communication to the third access layer 803 based on the at least two groups of candidate QoS requirement information of the multicast communication in the multicast group, where the third QoS requirement information includes a third communication range threshold. The third V2X layer 802 is further configured to receive second QoS status information of the multicast communication from the third access layer 803, where the second QoS status information includes second range indication information, and the second range indication information is used for determining that a range between the communication apparatus 800 shown in FIG. 8 and the fourth terminal is greater than the third communication range threshold. The third V2X layer 802 is further configured to send fourth QoS requirement information of the multicast communication to the third access layer 803, where the fourth QoS requirement information belongs to the at least two groups of candidate QoS requirement information, the fourth QoS requirement information includes a fourth communication range threshold, and the fourth communication range threshold is greater than the third communication range threshold.

For example, the second range indication information may include one or more of the following: an indication for out of range, location information of the fourth terminal, and the range between the communication apparatus 800 and the fourth terminal. The indication for out of range is used for indicating that the range between the communication apparatus 800 and the fourth terminal is greater than the third communication range threshold.

In a possible design, the third QoS requirement information may further include a third QoS requirement parameter. The second QoS status information may further include an unsatisfied QoS requirement parameter in the third QoS requirement parameter. The fourth QoS requirement information may include a fourth QoS requirement parameter. A QoS requirement corresponding to the fourth QoS requirement parameter is lower than a QoS requirement corresponding to the third QoS requirement parameter.

For example, the third QoS requirement parameter may include a third PQI, the fourth QoS requirement parameter may include a fourth PQI, and a QoS requirement corresponding to the fourth PC5 interface PQI is lower than a QoS requirement corresponding to the third PC5 interface PQI.

For example, the third QoS requirement parameter may include a third PC5 interface flow bit rate, the fourth QoS requirement parameter may include a fourth PC5 interface flow bit rate, and the fourth PC5 interface flow bit rate is lower than the third PC5 interface flow bit rate.

In a possible design, the third V2X layer 802 is further configured to receive a selection indication from the third application layer 801, where the selection indication is used for indicating the third V2X layer 802 to select one group of QoS requirement information from the at least two groups of candidate QoS requirement information.

It should be noted that the communication apparatus 800 shown in FIG. 8 may be any terminal in the multicast group, or may be a chip or a chip system disposed in the terminal. This is not limited in this application.

For technical effects of the communication apparatus 800 shown in FIG. 8, refer to technical effects of the communication method shown in FIG. 6. Details are not described herein again.

An embodiment of this application provides a chip system. The chip system includes a processor and an input/output port. The processor is configured to implement a processing function in the foregoing method embodiments, and the input/output port is configured to implement a transceiver function in the foregoing method embodiments.

In a possible design, the chip system further includes a memory. The memory is configured to store program instructions and data for implementing functions in the foregoing method embodiments.

The chip system may include a chip, or may include a chip and another discrete component.

An embodiment of this application provides a communication system. The communication system may include a first terminal and a second terminal. The first terminal and the second terminal may be respectively configured to perform steps or actions of the first terminal and the second terminal in the embodiment shown in FIG. 4 or FIG. 5.

An embodiment of this application further provides a communication system. The system may include a third terminal and a fourth terminal. The third terminal and the fourth terminal may be respectively configured to perform actions of the third terminal and the fourth terminal in the embodiment shown in FIG. 6.

It should be noted that the foregoing two communication systems each may provide a service for one multicast group. In addition, the two communication systems may further include another terminal. This is not limited in embodiments of this application.

An embodiment of this application provides a computer-readable storage medium, including the following. The computer-readable storage medium stores computer instructions. When the computer instructions are run on a computer, the computer is enabled to perform the communication method performed by the first terminal, the second terminal, or the third terminal in the foregoing method embodiments.

An embodiment of this application provides a computer program product including instructions, where the computer program product includes a computer program or the instructions. When the computer program is run or the instructions are run on a computer, the computer is enabled to perform the actions or steps of the first terminal, the second terminal, or the third terminal in the foregoing method embodiments.

It should be understood that, the processor in embodiments of this application may be a CPU, or may be another general-purpose processor, a DSP, an ASIC, an FPGA or another programmable logic device, a discrete gate or a transistor logic device, a discrete hardware component, or the like. The general-purpose processor may be a microprocessor, or the processor may be current processor or the like.

It may be further understood that the memory in embodiments of this application may be a volatile memory or a nonvolatile memory, or may include both a volatile memory and a nonvolatile memory. The nonvolatile memory may be a ROM, a programmable ROM (PROM), an erasable PROM (EPROM), an EEPROM, or a flash memory. The volatile memory may be a RAM and is used as an external cache. Through example but not limitative description, RAMs in various forms are available, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

All or some of the foregoing embodiments may be implemented by using software, hardware (for example, a circuit), firmware, or any combination thereof. When the software is used for implementation, all or some of the foregoing embodiments may be implemented in a form of a computer program product. The computer program product includes one or more computer instructions or computer programs. When the computer instructions or the computer programs are loaded and executed on the computer, the procedure or functions according to some embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In this application, "at least one" refers to one or more, and "a plurality of" refers to two or more. The term "at least one (piece) of the following" or a similar expression thereof means any combination of these items, including any combination of one (piece) or a plurality (pieces). For example, at least one (piece) of a, b, or c may indicate: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiment. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method implemented by a first terminal, wherein the communication method comprises:
    receiving first quality of service (QoS) status information of multicast communication in a multicast group, wherein the first QoS status information comprises range indication information, and wherein the multicast group comprises the first terminal and a second terminal;
    determining, based on the range indication information, that a range between the first terminal and the second terminal is greater than a first communication range threshold in first QoS requirement information of the multicast communication; and
    sending second QoS requirement information of the multicast communication, wherein the second QoS requirement information comprises a second communication range threshold that is greater than the first communication range threshold.

2. The communication method of claim 1, wherein the range indication information comprises one or more of an indication for out of range indicating that the range is greater than the first communication range threshold, location information of the second terminal, or the range.

3. The communication method of claim 1, wherein the first QoS requirement information comprises a first QoS requirement parameter, wherein the second QoS requirement information further comprises a second QoS requirement parameter, and wherein a second QoS requirement corresponding to the second QoS requirement parameter is lower than a first QoS requirement corresponding to the first QoS requirement parameter.

4. The communication method of claim 3, wherein the first QoS requirement parameter comprises a first PC5 QoS identifier (PQI) or a first PC5 interface flow bit rate, wherein the second QoS requirement parameter comprises a second PQI or a second PC5 interface flow bit rate, wherein a fourth QoS requirement corresponding to the second PQI is lower than a third QoS requirement corresponding to the first PQI, and wherein the second PC5 interface flow bit rate is lower than the first PC5 interface flow bit rate.

5. The communication method of claim 1, further comprising further receiving, by an application layer of the first terminal and either from an application server or from the second terminal through a vehicle-to-everything (V2X) layer of the first terminal and an access layer of the first terminal, the first QoS status information.

6. The communication method of claim 1, further comprising further sending, by an application layer of the first terminal and either to an access layer of the first terminal through a vehicle-to-everything (V2X) layer of the first terminal or to the second terminal through the V2X layer and the access layer, the second QoS requirement information.

7. A communication method implemented by a second terminal, wherein the communication method comprises:
    sending first quality of service (QoS) status information of multicast communication in a multicast group, wherein the multicast group comprises a first terminal and the second terminal, wherein the first QoS status information comprises range indication information for determining that a range between the first terminal and the second terminal is greater than a first communication range threshold in first QoS requirement information of the multicast communication;
    receiving second QoS requirement information of the multicast communication, wherein the second QoS requirement information comprises a second communication range threshold, and wherein the second communication range threshold is greater than the first communication range threshold; and
    updating, based on the second QoS requirement information, a first QoS requirement of the multicast communication.

8. The communication method of claim 7, wherein the range indication information comprises one or more of an indication for out of range indicating that the range is greater than the first communication range threshold, location information of the second terminal, and the range.

9. The communication method of claim 7, wherein the first QoS requirement information comprises a first QoS requirement parameter, wherein the second QoS requirement information further comprises a second QoS requirement parameter, and wherein a second QoS requirement corresponding to the second QoS requirement parameter is lower than a third QoS requirement corresponding to the first QoS requirement parameter.

10. The communication method of claim 9, wherein the first QoS requirement parameter comprises a first PC5 QoS identifier (PQI) or a first PC5 interface flow bit rate, wherein the second QoS requirement parameter comprises a second PQI or a second PC5 interface flow bit rate, wherein a fourth QoS requirement corresponding to the second PQI is lower than a fifth QoS requirement corresponding to the first PQI, and wherein the second PC5 interface flow bit rate is lower than the first PC5 interface flow bit rate.

11. The communication method of claim 7, further comprising further sending, by an application layer of the second terminal either to an application server or to the first terminal through a vehicle-to-everything (V2X) layer of the second terminal and an access layer of the second terminal, the first QoS status information.

12. The communication method of claim 7, further comprising further receiving, by an application layer of the second terminal and from the first terminal through a vehicle-to-everything (V2X) layer of the second terminal and an access layer of the second terminal, the second QoS requirement information.

13. A communication apparatus comprising:
a memory configured to store instructions; and
a processor coupled to the memory and configured to execute the instructions to cause the communication apparatus to:
receive first quality of service (QoS) status information of multicast communication in a multicast group, wherein the multicast group comprises a first terminal and a second terminal, and wherein the first QoS status information comprises range indication information;
determine, based on the range indication information, that a range between the first terminal and the second terminal is greater than a first communication range threshold in first QoS requirement information of the multicast communication; and
send second QoS requirement information of the multicast communication, wherein the second QoS requirement information comprises a second communication range threshold, and wherein the second communication range threshold is greater than the first communication range threshold.

14. The communication apparatus of claim 13, wherein the first range indication information comprises one or more of an indication for out of range indicating that the range is greater than the first communication range threshold, location information of the second terminal, or the range.

15. The communication apparatus of claim 13, wherein the first QoS requirement information comprises a first QoS requirement parameter, wherein the second QoS requirement information further comprises a second QoS requirement parameter, and wherein a second QoS requirement corresponding to the second QoS requirement parameter is lower than a first QoS requirement corresponding to the first QoS requirement parameter.

16. The communication apparatus of claim 15, wherein the first QoS requirement parameter comprises a first PC5 QoS identifier (PQI) or a first PC5 interface flow bit rate, wherein the second QoS requirement parameter comprises a second PQI or a second PC5 interface flow bit rate, wherein a fourth QoS requirement corresponding to the second PQI is lower than a third QoS requirement corresponding to the first PQI, and wherein the second PC5 interface flow bit rate is lower than the first PC5 interface flow bit rate.

17. A communication apparatus comprising:
a memory configured to store instructions; and
a processor coupled to the memory and configured to execute the instructions to cause the communication apparatus to:
send first quality of service (QoS) status information of multicast communication in a multicast group, wherein the multicast group comprises a first terminal and a second terminal, wherein the first QoS status information comprises range indication information determining that a range between the first terminal and the second terminal is greater than a first communication range threshold in first QoS requirement information of the multicast communication;
receive second QoS requirement information of the multicast communication, wherein the second QoS requirement information comprises a second communication range threshold, and wherein the second communication range threshold is greater than the first communication range threshold; and
update, based on the second QoS requirement information, a first QoS requirement of the multicast communication.

18. The communication apparatus of claim 17, wherein the range indication information comprises one or more of an indication for out of range indicating that the range is greater than the first communication range threshold, location information of the second terminal, or the range.

19. The communication apparatus of claim 17, wherein the first QoS requirement information comprises a first QoS requirement parameter, wherein the second QoS requirement information further comprises a second QoS requirement parameter, and wherein a second QoS requirement corresponding to the second QoS requirement parameter is lower than a third QoS requirement corresponding to the first QoS requirement parameter.

20. The communication apparatus of claim 19, wherein the first QoS requirement parameter comprises a first PC5 QoS identifier (PQI) or a first PC5 interface flow bit rate, wherein the second QoS requirement parameter comprises a second PQI or a second PC5 interface flow bit rate, wherein a fourth QoS requirement corresponding to the second PQI is lower than a fifth QoS requirement corresponding to the first PQI, and wherein the second PC5 interface flow bit rate is lower than the first PC5 interface flow bit rate.

* * * * *

UNITED STATES PATENT AND TRADEMARK OFFICE
CERTIFICATE OF CORRECTION

PATENT NO. : 12,108,288 B2
APPLICATION NO. : 17/748231
DATED : October 1, 2024
INVENTOR(S) : Weijun Xing and Wenfu Wu Page 1 of 1

It is certified that error appears in the above-identified patent and that said Letters Patent is hereby corrected as shown below:

On the Title Page

Page 2, Foreign Patent Documents: "IN 109996306 A 7/2019" should read "CN 109996306 A 7/2019"

Signed and Sealed this
Third Day of December, 2024

Katherine Kelly Vidal
*Director of the United States Patent and Trademark Office*